(12) United States Patent
Mayfield

(10) Patent No.: US 12,203,283 B2
(45) Date of Patent: Jan. 21, 2025

(54) TOWER BRACKET, TIE OFF AND HOIST SYSTEM

(71) Applicant: James S. Mayfield, Murfreesboro, TN (US)

(72) Inventor: James S. Mayfield, Murfreesboro, TN (US)

(73) Assignee: MATT'S ARM, LLC, Murfreesboro, TN (US)

( * ) Notice: Subject to any disclaimer, the term of this patent is extended or adjusted under 35 U.S.C. 154(b) by 0 days.

(21) Appl. No.: 18/669,251

(22) Filed: May 20, 2024

(65) Prior Publication Data

US 2024/0384556 A1 Nov. 21, 2024

Related U.S. Application Data

(60) Provisional application No. 63/467,425, filed on May 18, 2023.

(51) Int. Cl.
*E04H 12/24* (2006.01)
*F16B 2/08* (2006.01)

(52) U.S. Cl.
CPC .............. *E04H 12/24* (2013.01); *F16B 2/08* (2013.01)

(58) Field of Classification Search
CPC ......... E04H 12/24; F16B 2/08; B66C 23/203; B66C 23/26; B66C 23/62; G09F 2007/1804; G09F 2007/1808; G09F 2007/1817; A01M 31/02
USPC ................. 248/218.4, 219.2–219.4
See application file for complete search history.

(56) References Cited

U.S. PATENT DOCUMENTS

| | | | |
|---|---|---|---|
| 1,432,561 A * | 10/1922 | Johnson, Jr. | H02G 1/02 403/392 |
| 2,309,769 A | 2/1943 | Hubbard | |
| 5,366,194 A * | 11/1994 | Finney | F16M 13/022 396/428 |
| 6,983,856 B1 | 1/2006 | Burks | |
| 11,235,959 B2 | 2/2022 | Mayfield | |
| 11,485,616 B2 | 11/2022 | Mayfield | |
| 11,760,611 B2 | 9/2023 | Mayfield | |
| 2011/0083399 A1* | 4/2011 | Lettkeman | E04H 12/24 248/219.4 |
| 2011/0108787 A1* | 5/2011 | Thomas | B66C 23/203 254/390 |
| 2021/0246002 A1* | 8/2021 | Mayfield | E04H 12/345 |

FOREIGN PATENT DOCUMENTS

WO 2023/147096 A1 8/2023

\* cited by examiner

*Primary Examiner* — Christopher Garft
(74) *Attorney, Agent, or Firm* — Shane Cortesi

(57) ABSTRACT

Brackets, tie offs and hoist systems are described as well as methods of securing same to telecommunication and other towers. The bracket may be secured to the tower by one or more leg straps, leg clamp bars or one or more cable systems. The cable systems may be rotatably attached to the brackets allowing for adjustment of the cable system. Adapter brackets are also described that comprises different shaped recesses for attachment to different style towers. The bracket may comprise a vertically-oriented eye bolt attaching a D-ring to the bracket or and/or a hoist beam supporting one or more sheaves may be secured to the bracket.

20 Claims, 20 Drawing Sheets

TOWER BRACKET, TIE OFF AND HOIST SYSTEM

BACKGROUND

Technical Field

The present application relates to brackets, tie offs and hoists for working on towers. The tower may be a cell phone or other telecommunication tower containing antennas or alternatively may be a structural column in a building.

Background of the Invention

There are different types of cell phone towers, including monopole, lattice, guyed, and camouflaged. For example, the monopole tower requires one foundation and height does not exceed about 200 feet. In this type, antennas are mounted on the exterior of the tower. Next, lattice towers are usually seen along the highways. They are three and four sided. Guyed towers are cheap to construct but cover large areas. Radio and TV stations use this type of cell phone tower. This tower uses guy wires connected to the ground to provide the support to the straight tower in the middle. It is about 300 feet or more in height. Finally, camouflaged towers are more expensive compared to other cell tower types. They are often required by zoning.

Unfortunately, due to the quick growth of cell phones and data demands, which necessitate that the towers be located near populated areas, working on cell phone towers has become very expensive (necessitating expensive lifts) and dangerous. In addition, tower maintenance can require Class IV rigging plans requiring engineering sign off, resulting in delays and expenses.

U.S. Pat. No. 10,464,788 describes a portable hoisting system having an upright pole for tower repair. However, among other things, the product is bulky, has a high center of gravity above the tower, and involves loading the pulley with the load line through the piping.

The present inventor designed systems described in U.S. Pat. Nos. 11,485,616 and 11,235,959, the entire contents of which are incorporated herein by reference. However, there is a continuing need for systems that are robust yet easy to assemble, portable, lightweight and cheap to manufacture.

BRIEF SUMMARY

In some embodiments, the present disclosure provides a bracket, tie off and hoist system for towers such as telecommunications towers and columns in a building. In some embodiments, the method may include attaching the system to a monopole. In other embodiments, the system may attach to towers having multiple legs, such as guyed or self-support towers or high voltage towers, including those carrying telecommunications equipment.

In some embodiments, the present disclosure provides a method of securing a bracket to a tower comprising a tower top located above the ground, a tower bottom and a tower height extending from the tower top to the tower bottom, the tower comprised of one or more poles or legs, the method comprising performing the following steps in any suitable order including simultaneously: a) providing a bracket that may have a top, a bottom, a height extending from the top to the bottom, a left side, a right side, a width extending from the left side to the right side and perpendicular to the height, a front, a rear configured to confront a pole or leg of the tower, and/or a thickness extending from the front to the rear and perpendicular to the height and the width, the bracket optionally comprised of a rear plate, an upper horizontal plate extending forwardly from the rear plate generally perpendicular to the bracket height, a lower horizontal plate located below the upper horizontal plate and extending forwardly from the rear plate, and a vertically-oriented eye bolt comprising a looped head located below the lower horizontal plate and a threaded shaft extending from the looped head upwardly through the lower horizontal plate and the upper horizontal plate; b) providing a cable system or a leg strap or leg clamp bar; and c) securing the bracket to the tower by placing the bracket rear against a pole or leg of the tower and wrapping the cable system or strap or leg clamp bar behind and/or at least partially around the pole or leg of the tower.

Optionally, the tower is a guyed or self-support tower comprising a plurality of legs, step b) comprises providing a leg strap or leg clamp bar having a left end and a right end, and the bracket is secured to the leg strap or leg clamp bar by a plurality of leg strap or leg clamp fasteners. Optionally, the leg strap comprises a left straight segment, a right straight segment, and an arc-shaped middle segment between the left and right straight segment and extending at least partially around the leg. Optionally, the leg clamp bar is positioned behind the tower pole or leg. Optionally, the tower is a monopole and the cable system comprises one or more chains. Optionally, the tower is a monopole, wherein step b) comprises providing a cable system comprising a left end and a right end, wherein the bracket further comprises a rotatable left cable adjustment bracket located between the upper and lower horizontal plates, pivotally attached to the upper and lower horizontal plates by at least one left bolt oriented parallel to the bracket height, wherein the rotatable cable adjustment left bracket is further attached to the left end of the cable system, wherein the rotatable left cable adjustment bracket is configured to rotate clockwise and/or counter-clockwise relative to the upper and lower horizontal plates about a left bolt axis extending generally parallel to the bracket height to adjust the cable system around the monopole, wherein the bracket further comprises a rotatable right cable adjustment bracket located between the upper and lower horizontal plates, pivotally attached to the upper and lower horizontal plates by at least one right bolt oriented parallel to the bracket height, wherein the rotatable right cable adjustment bracket is further attached to the right end of the cable system, wherein the rotatable left cable adjustment bracket is configured to rotate clockwise and/or counter-clockwise relative to the upper and lower horizontal plates about a right bolt axis extending generally parallel to the bracket height to adjust the cable system around the monopole. Optionally, the cable system left end comprises a left horizontally-oriented eye bolt, the left horizontally-oriented eye bolt attached to the rotatable left cable adjustment bracket, wherein the cable system right end comprises a right horizontally-oriented eye bolt, the right horizontally-oriented eye bolt attached to the rotatable right cable adjustment bracket. Optionally, the bracket rear comprises at least one recess engaging the leg or pole of the tower. Optionally, the rear plate comprises a rear forming the bracket rear and comprising the at least one recess. Optionally, an adapter bracket is removably attached to the rear plate by one or more fasteners and comprises the at least one recess. Optionally, the adapter bracket comprises first plate comprising a first recess configured to mate with a leg or side of a first type of tower, a second plate comprising a second recess configured to mate with a leg or side of a second type of tower, the first type of power different than the second type of tower, the first and second plates forming a corner having an angle of approximately 90 degrees, the first and second recesses having a different shape. Optionally, the first recess is wedge-shaped. Optionally, the first recess comprises a left side angled edge, and a right side angled edge, and further wherein the left side angled edge slopes forwardly from the left side toward the right angled edge and the right side angled edge slopes forwardly from the right side toward the left angled edge. Optionally, the left side angled edge and the right side angled edges confront at least two sides of a monopole. Optionally, the second recess is triangular in shape or in the shape of a truncated triangle. Optionally, the vertically-oriented eye bolt secures a D-ring bracket to the upper and lower horizontal plates, the D-ring bracket comprising a D-ring extend laterally relative to the tower. Optionally, the D-ring bracket and D-ring are configured to rotate clockwise and/or counter-clockwise relative to the upper and lower horizontal plates about a pivot axis extending generally parallel to the bracket height. Optionally, the method further comprises securing a user to the tower by securing a lower end of a user cable support system to the user and the upper end of the user cable support system to the D-ring. Optionally, the looped head is located less than about 2 inches directly below the lower horizontal plate. Optionally, the method further comprises removing the vertically-oriented eye bolt and attaching a hoist beam comprising one or more sheaves to the bracket. Optionally, the upper and lower horizontal plates are oriented parallel to each other and separated by a gap having a height parallel to the bracket height.

In still further embodiments the present disclosure provides a method of securing a bracket to a tower comprising a tower top located above the ground, a tower bottom and a tower height extending from the tower top to the tower bottom, optionally wherein the tower is a monopole, the method comprising performing the following steps in any suitable order including simultaneously: a) providing a bracket that may have a top, a bottom, a height extending from the top to the bottom, a left side, a right side, a width extending from the left side to the right side and perpendicular to the height, a front, a rear configured to confront a pole or leg of the tower, and/or a thickness extending from the front to the rear and perpendicular to the height and the width, the bracket optionally comprised of a rear plate, an upper horizontal plate extending forwardly from the rear plate generally perpendicular to the bracket height, and/or a lower horizontal plate located below the upper horizontal plate and extending forwardly from the rear plate; b) providing a cable system having a left end and a right end; and c) securing the bracket to the monopole by optionally placing the bracket rear against the monopole and optionally wrapping the cable system at least partially around the monopole, wherein the bracket optionally further comprises a rotatable left cable adjustment bracket located between the upper and lower horizontal plates, pivotally attached to the upper and lower horizontal plates by at least one left bolt oriented parallel to the bracket height, wherein the rotatable left cable adjustment bracket optionally is further attached to the left end of the cable system, wherein the rotatable left cable adjustment bracket optionally is configured to rotate clockwise and/or counter-clockwise relative to the upper and lower horizontal plates about a left bolt axis extending generally parallel to the bracket height to adjust the cable system around the monopole, wherein the bracket optionally further comprises a rotatable right cable adjustment bracket located between the upper and lower horizontal plates, pivotally attached to the upper and lower horizontal plates by at least one right bolt oriented parallel to the bracket height, wherein the right bracket optionally is further attached to the right end of the cable system, wherein the rotatable left cable adjustment bracket optionally is configured to rotate clockwise and/or counter-clockwise relative to the upper and lower horizontal plates about a right bolt axis extending generally parallel to the bracket height to adjust the cable system around the monopole. Optionally, the method further comprises a hoist beam comprising a forward end, a rear end, a hoist beam length extending from the forward end to the rear end, wherein, at least after complete installation, the hoist beam extends laterally from the bracket. Optionally, the hoist beam is connected to at least one load-end sheave and at least one return sheave located rearwardly relative to the at least one load-end sheave, and optionally, a load line extends from below the at least one load-end sheave, at least partially around the at least one load-end sheave and at least partially around the at least one return sheave and then below the at least one return sheave. The bracket may be attached to the monopole using, for example, an adapter bracket described above. In addition, the bracket and cable system may comprise one or more features described above

BRIEF DESCRIPTION OF THE DRAWINGS

in FIG. 5, the monopole has been removed for purposes of illustrating the bracket rear.

in FIG. 9, the monopole is not shown.

FIG. 9 illustrates a side elevation view of the bracket of FIG. 6.

in FIG. 10, the monopole is not shown.

in FIG. 21, the monopole is not shown.

DETAILED DESCRIPTION

Figure 1:
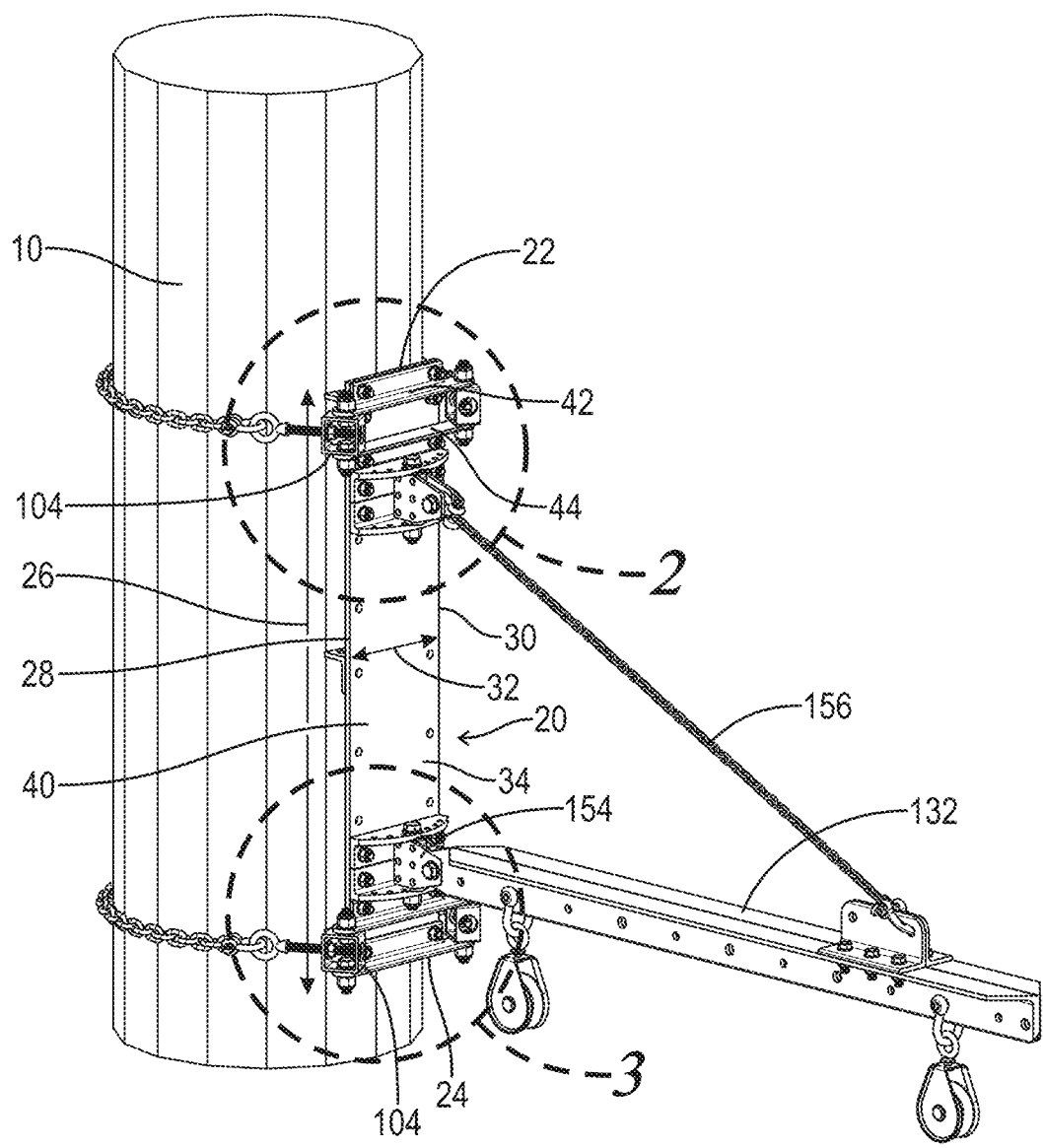
FIG. 1 illustrates a side perspective view of a bracket and a hoist beam secured to a monopole by two cable systems in accordance with one embodiment of the present invention.
Figure 2:
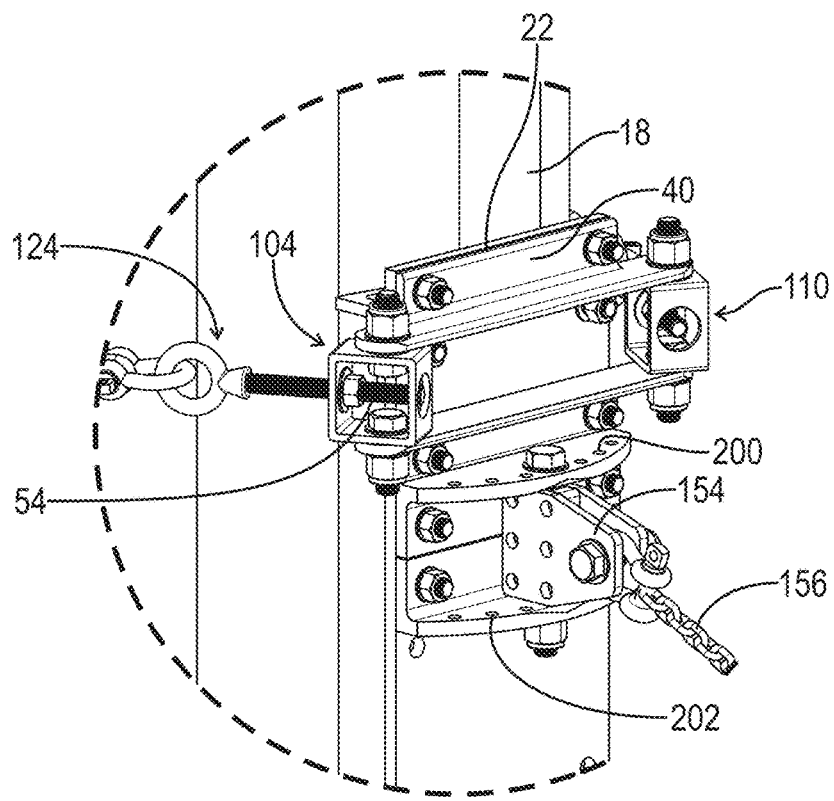
FIG. 2 illustrates a side perspective view of the circled area labelled 2 in FIG. 1.
Figure 3:
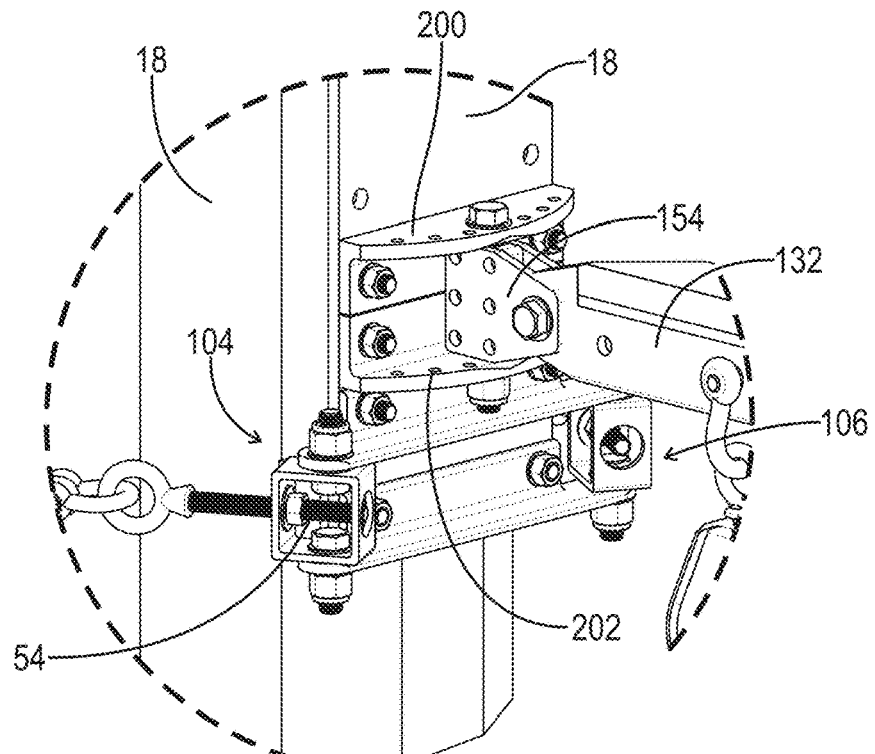
FIG. 3 illustrates a side perspective view of the area labelled 3 in FIG. 1.

With reference to FIGS. 1-22 the present disclosure provides brackets 18, tie offs 168 and hoist systems 46 and 132 that may be secured to a tower 10, such as a telecommunications tower (e.g., a monopole, self-support tower or guyed tower), preferably on a temporary basis, for example, to allow operators to maintain equipment and add to equipment on the tower 10. In the drawings, not all reference numbers are included in each of the drawings for the sake of clarity. The drawings are CAD drawings drawn to scale (except for the height 16 of the tower 10), however, it will be appreciated that other dimensions are possible. In addition, all dimensions and notes provided in the drawings are exemplary.

In some cases, the tower 10 may be a telecommunications tower. For example, the bracket 20 may be attached to cell phone towers 10 including monopole, guyed, or self-support towers 10. In the case of a monopole tower 10 or other similar tower 10, the tower 10 may have one pole 18. In the case of guyed, self-support, or similar towers 10, the tower 10 may include, for example, a plurality of legs 18. Optionally, the telecommunications tower 10 may further comprise an antenna.

Figure 11:
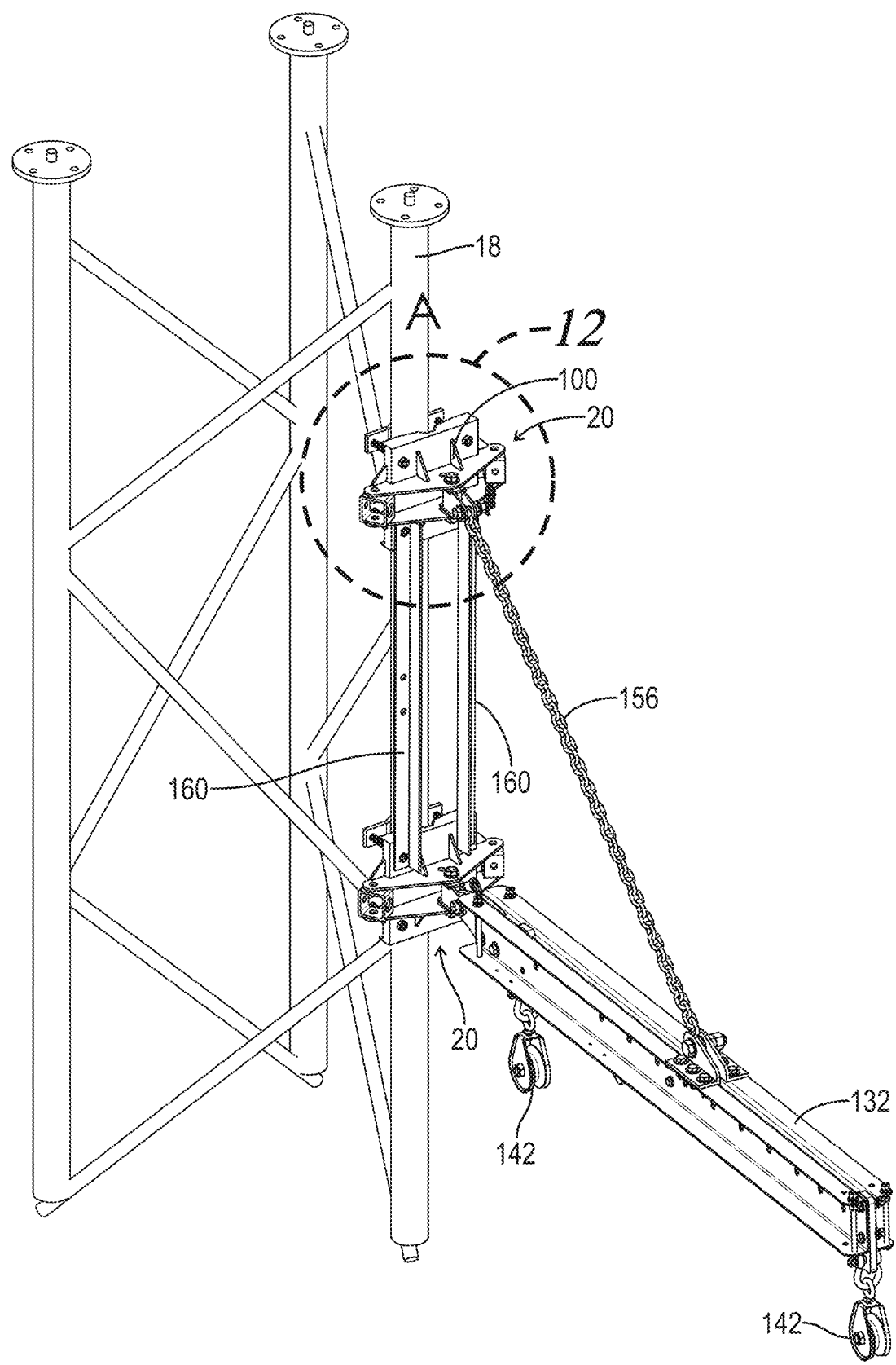
FIG. 11 illustrates a front perspective view of two brackets and a hoist beam secured to a leg of a tower by two cable systems in accordance with one embodiment of the present invention.
Figure 12:
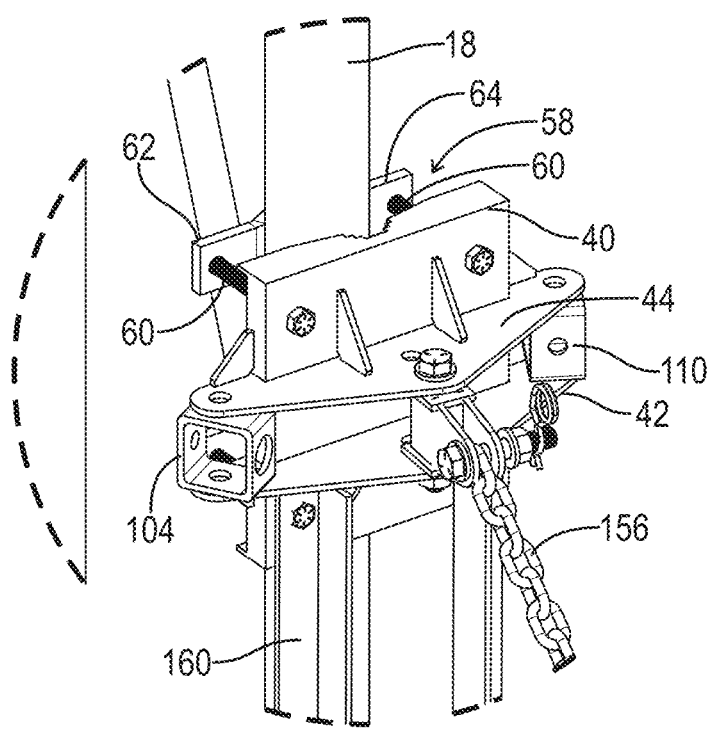
FIG. 12 illustrates a front perspective view of the circled area labelled 12 in FIG. 11.
Figure 13:
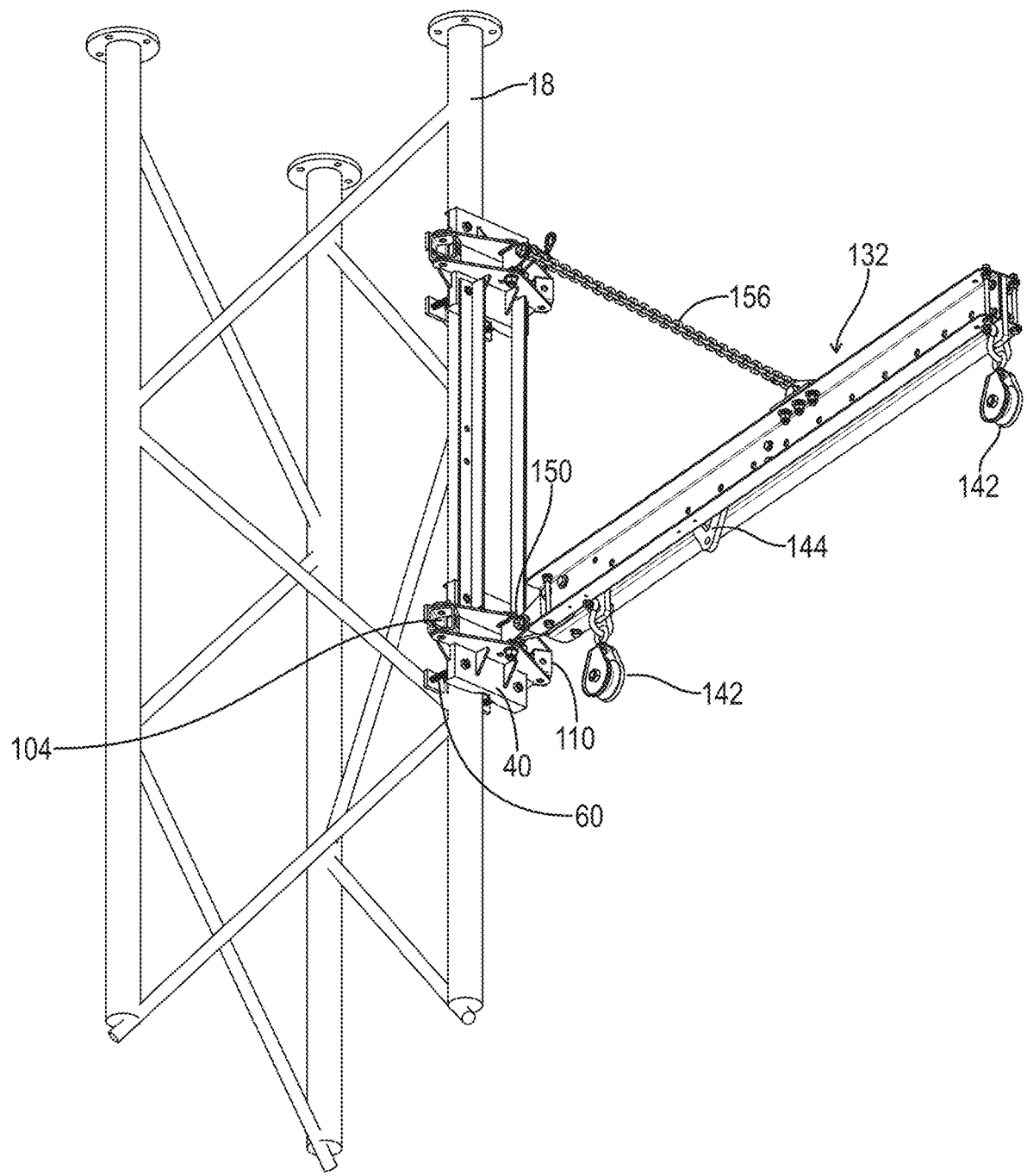
FIG. 13 illustrates a bottom perspective view of the brackets, hoist beam, tower and cable systems of FIG. 11.
Figure 14:
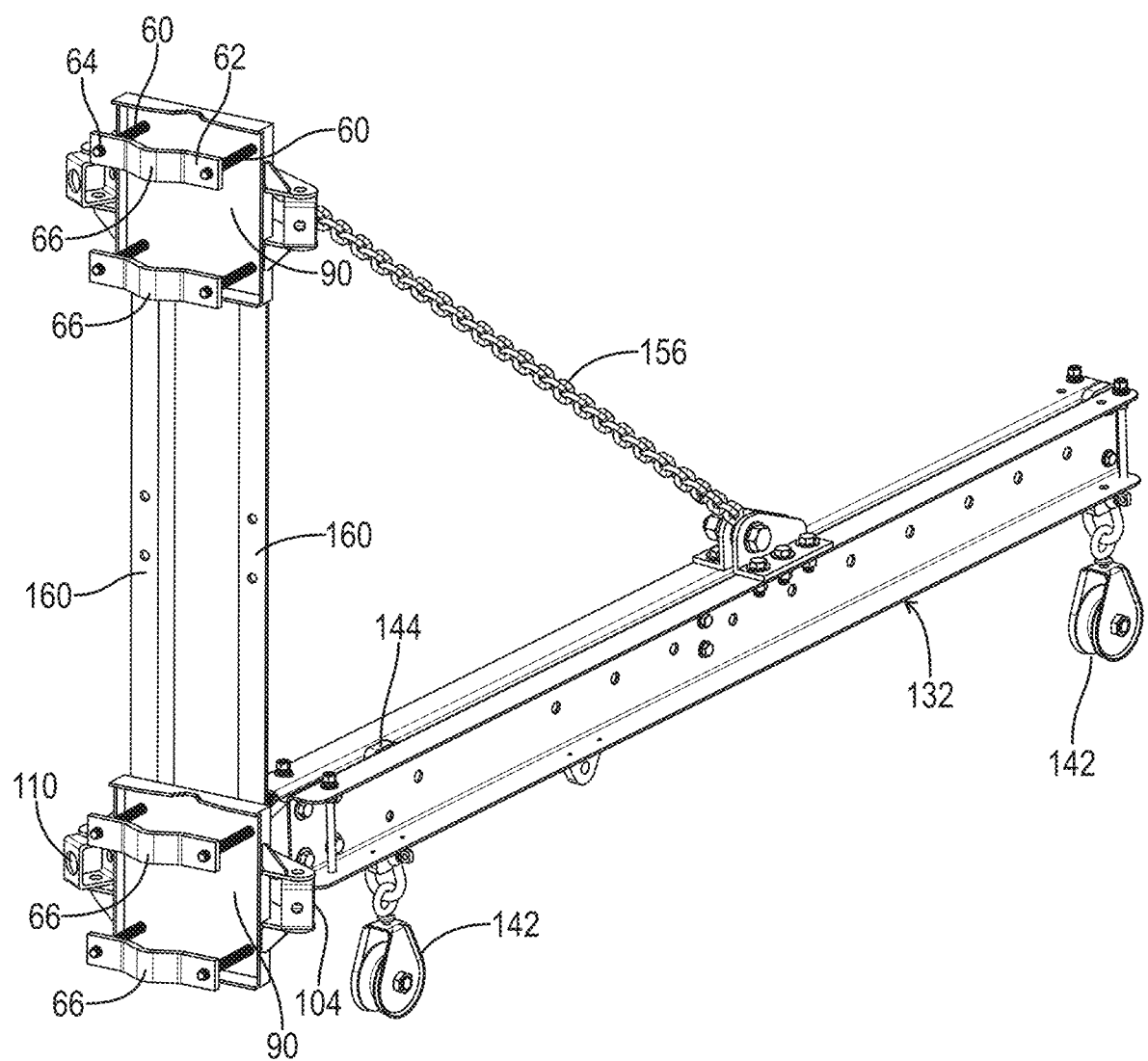
FIG. 14 illustrates a rear perspective view of the brackets, hoist beam, and cable systems of FIG. 11; the tower is not shown in FIG. 14.
Figure 15A:
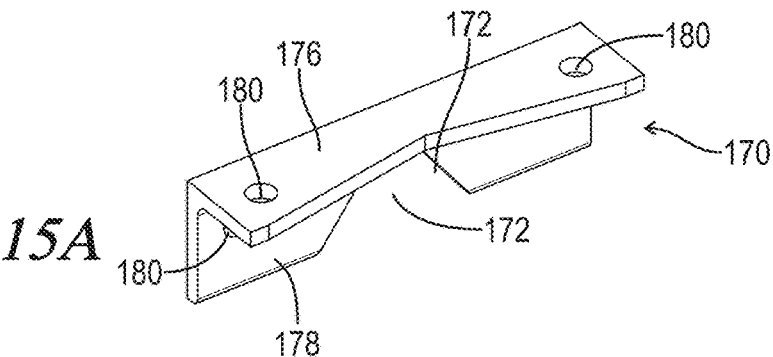
FIG. 15A illustrates a rear perspective view of a L-shaped combined monopole/tower leg adapter bracket in accordance with one embodiment of the present invention.
Figure 15B:
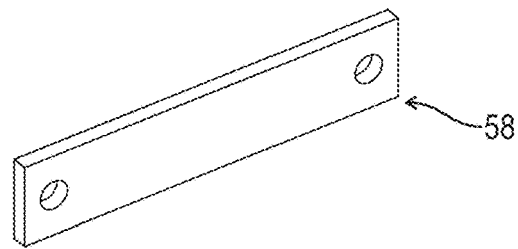
FIG. 15B illustrates a rear perspective view of a flat leg clamp bar in accordance with one embodiment of the present invention.
Figure 15C:
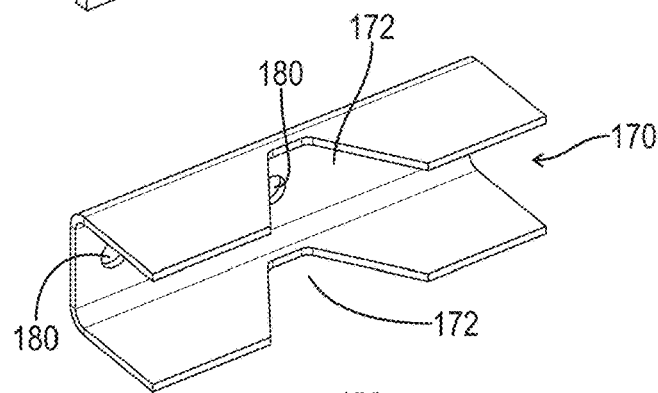
FIG. 15C illustrates a rear perspective view of a 60 degree leg adapter bracket in accordance with one embodiment of the present invention.
Figure 15D:
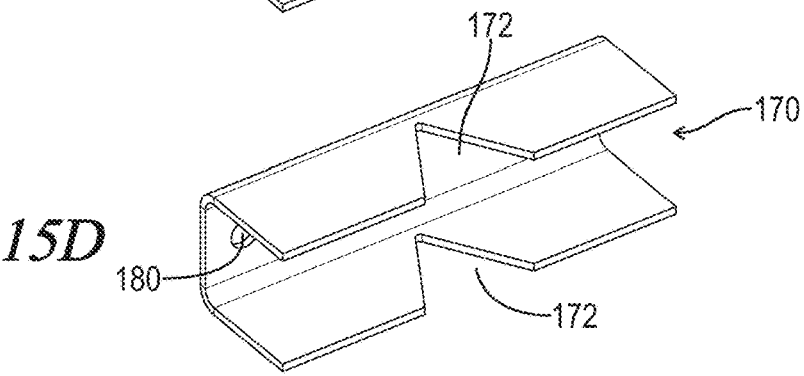
FIG. 15D illustrates a rear perspective view of a round leg adapter bracket in accordance with one embodiment of the present invention.
Figure 15E:
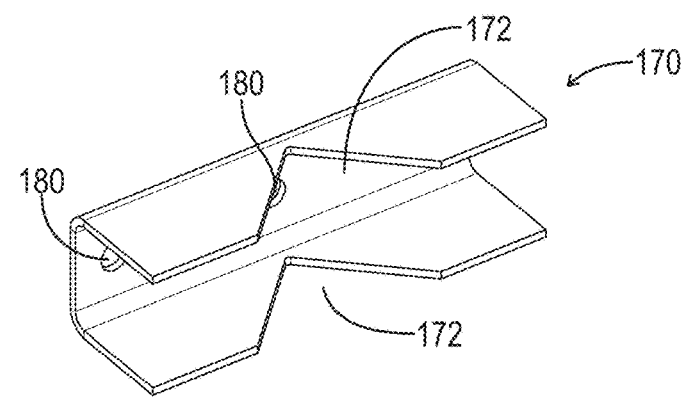
FIG. 15E illustrates a rear perspective view of a 90 degree leg adapter bracket in accordance with one embodiment of the present invention.
Figure 16A:
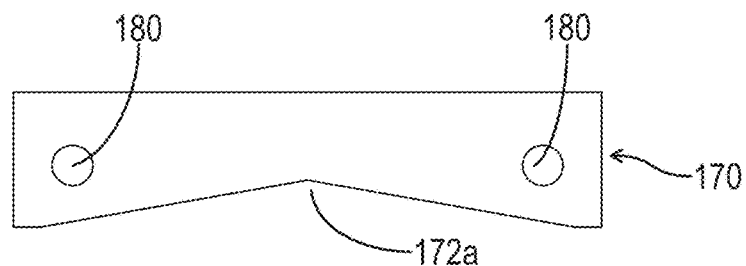
FIG. 16A illustrates a top plan view of the adapter bracket of FIG. 15A.
Figure 16B:
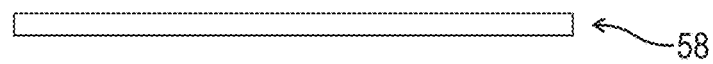
FIG. 16B illustrates a top plan view of the bar of FIG. 15B.
Figure 16C:
FIG. 16C illustrates a top plan view of the adapter bracket of FIG. 15C.
Figure 16D:
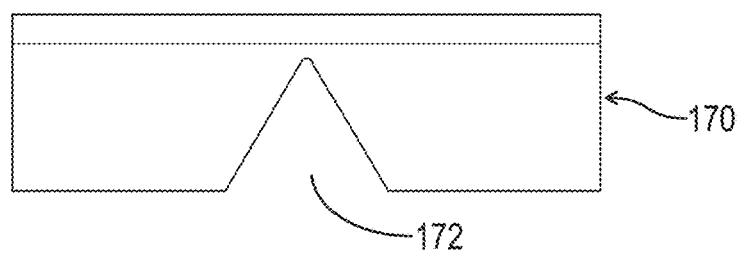
FIG. 16D illustrates a top plan view of the adapter bracket of FIG. 15D.
Figure 16E:
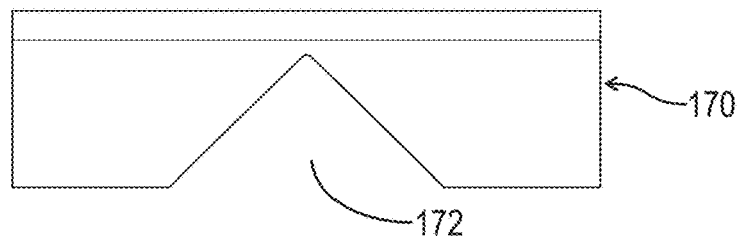
FIG. 16E illustrates a top plan view of the adapter bracket of FIG. 15E.
Figure 17:
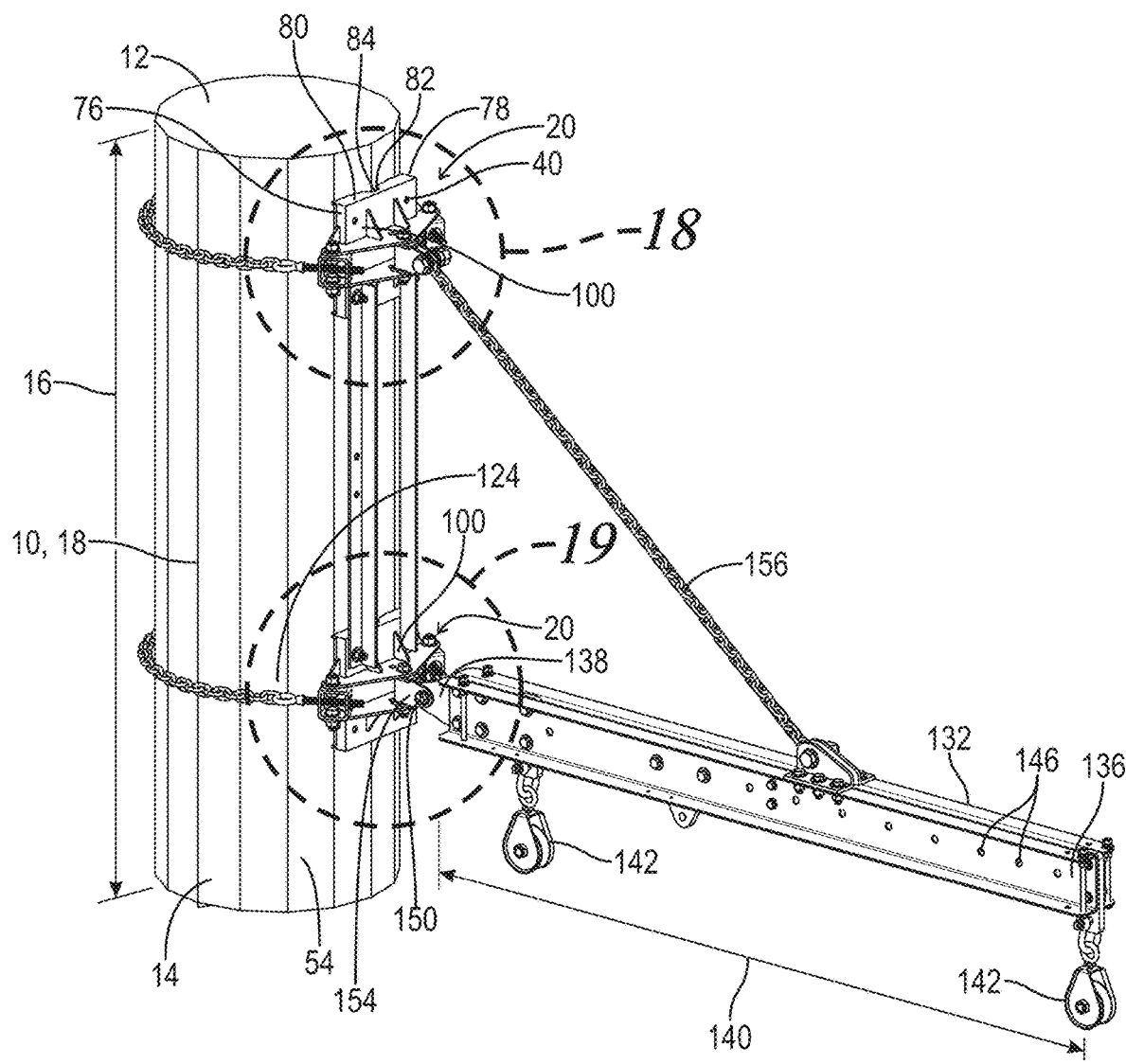
FIG. 17 illustrates a side perspective view of two brackets and a hoist beam secured to a monopole by two cable systems in accordance with another embodiment of the present invention.
Figure 18:
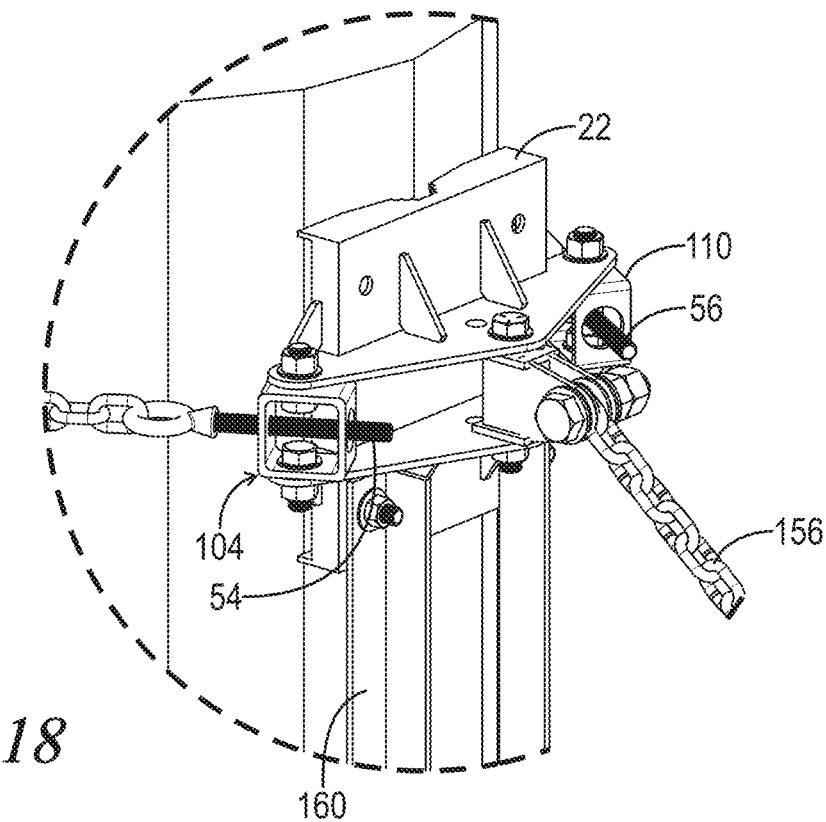
FIG. 18 illustrates a side perspective view of the circled area labelled 16 in FIG. 17.
Figure 19:
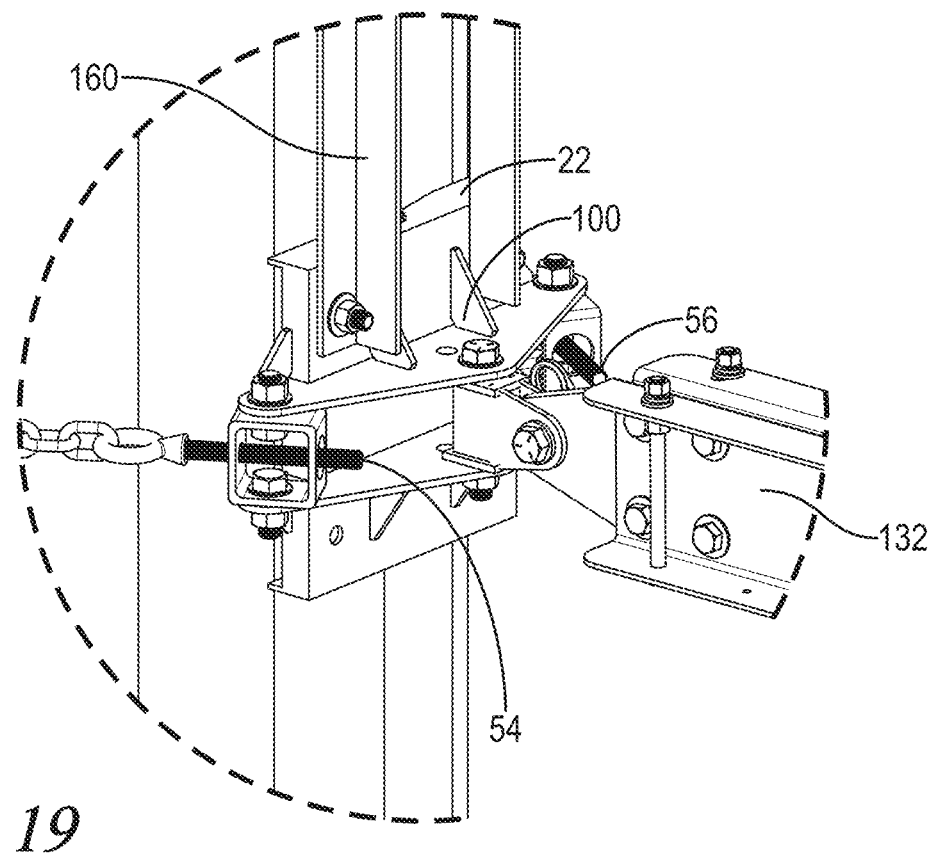
FIG. 19 illustrates a side perspective view of the area labelled 17 in FIG. 17.
Figure 20:
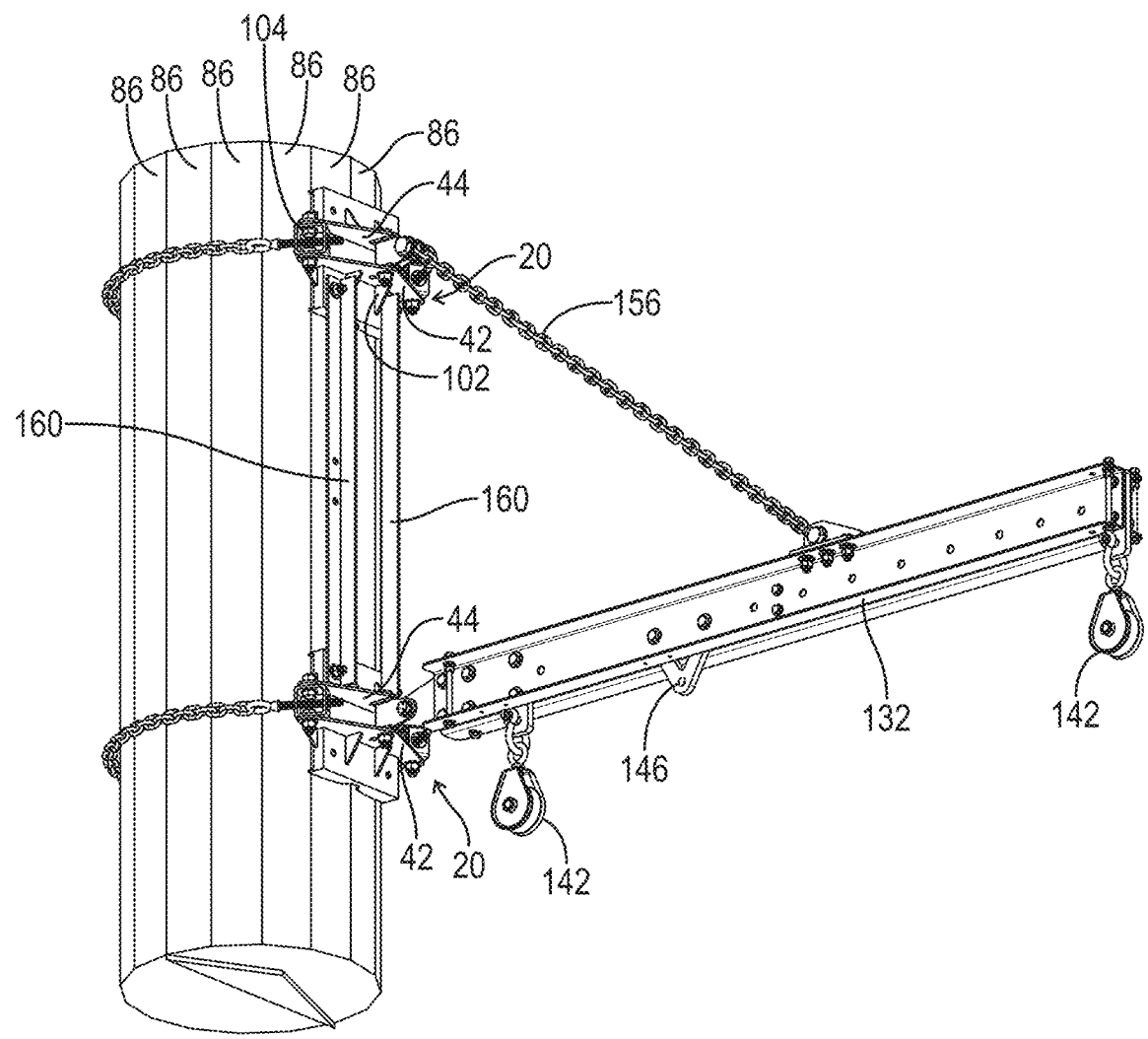
FIG. 20 illustrates a bottom perspective view of the brackets, hoist beam, cable system and monopole of FIG. 17.
Figure 21:
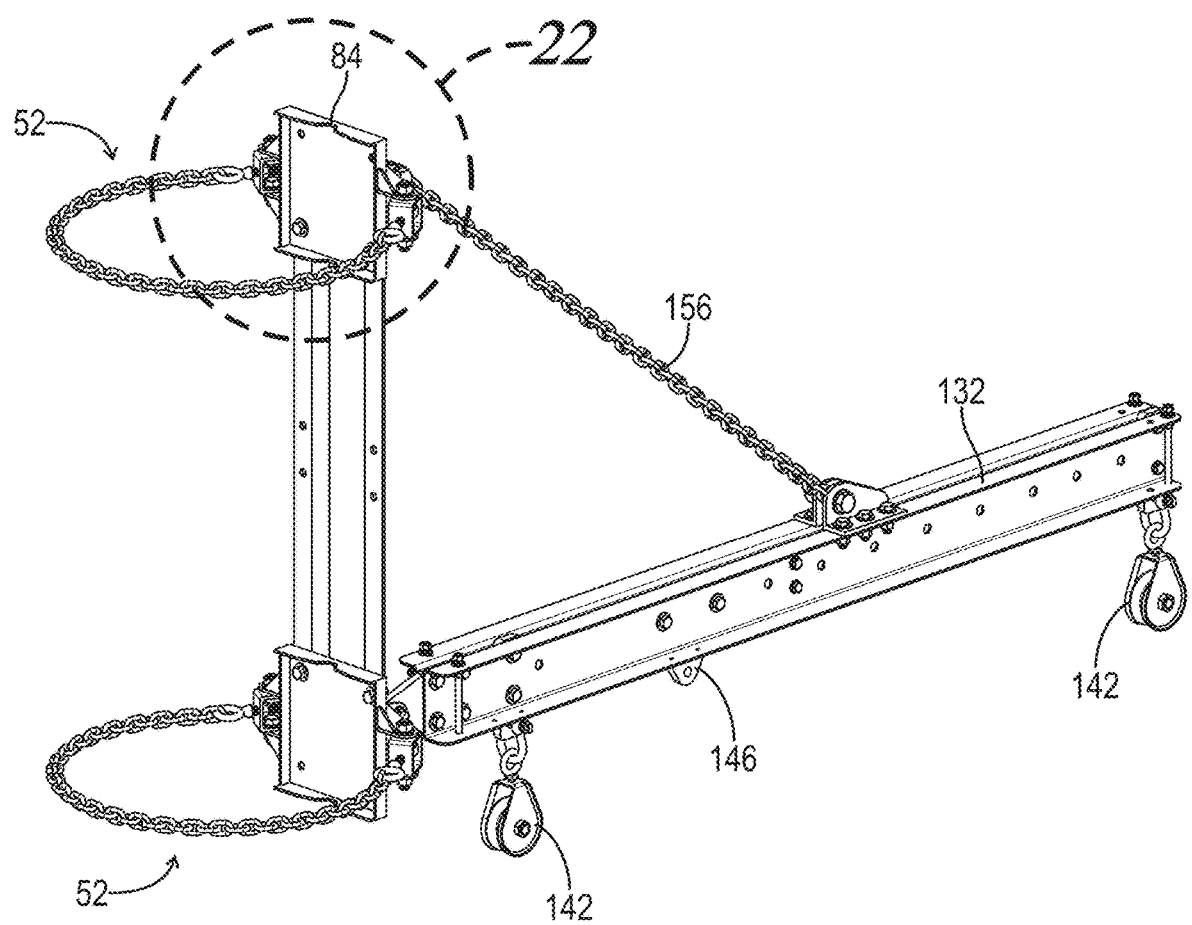
FIG. 21 illustrates a rear perspective view of the brackets, hoist beam, and cable system of FIG. 17.
Figure 22:
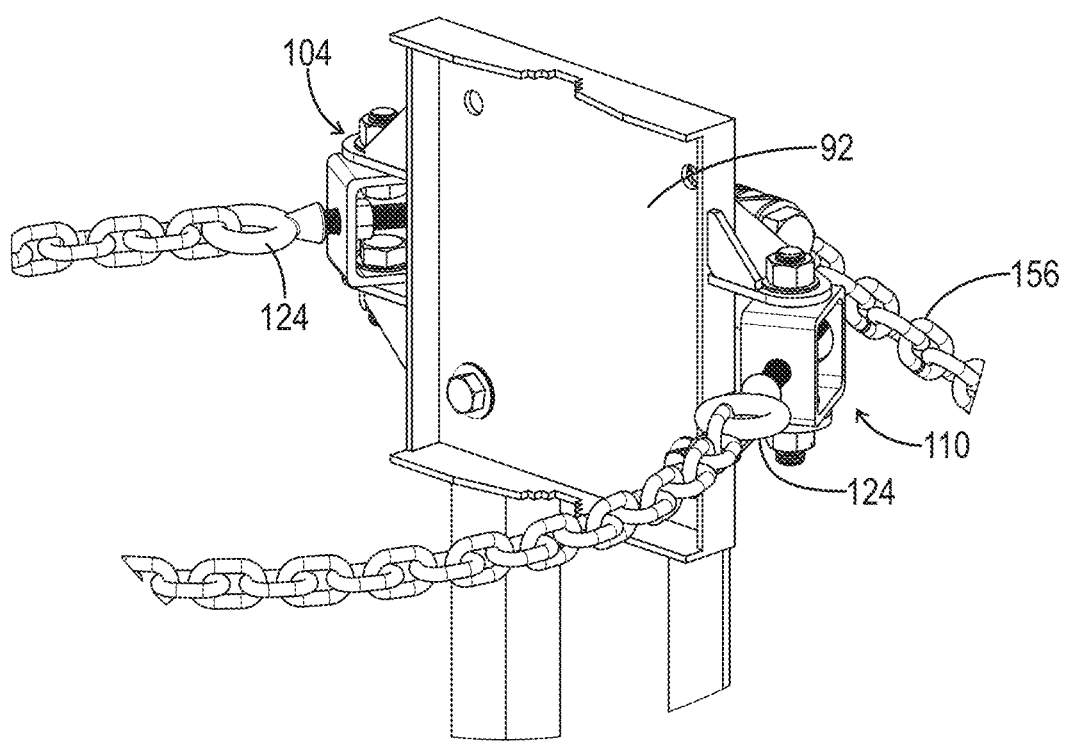
FIG. 22 illustrates a rear perspective view of the area labelled 22 in FIG. 21.

As shown in FIGS. 1-22, the brackets 20 that connect beams 132 to the tower pole or leg 18 are preferably part of a clamp system. In other words, as shown in the illustrations, the brackets 20 may be connected to tension cables such as chains 52 that are wrapped tightly around the perimeter/outer wall/outer surface of the tower pole or leg 18 or, as shown in FIGS. 11-12, a strap or leg clamp bar 58 that goes behind tower pole or leg 18. Accordingly, preferably, the brackets 20 are held in place on the tower pole or legs 18 by tension, as opposed to using bolts to connect the brackets 20 to the tower pole or leg 18. Preferably, the clamp systems are adjustable so that they may be used on towers of different dimensions. However, other configurations are possible.

More particularly, with reference to FIGS. 1-22, in some embodiments the present disclosure provides a method of securing a bracket 20 to a tower 10. The tower 10 may include a tower top 12 located above the ground, a tower bottom 14 and a tower height 16 extending from the tower top 14 to the tower bottom 16. The tower 10 may be comprised of one or more poles or legs 18. The method may comprise a) providing a bracket 20 that may have a top 22, a bottom 24, a height 26 extending from the top 22 to the bottom 24, a left side 28, a right side 30, a width 32 extending from the left side 28 to the right side 30 and perpendicular to the height 26, a front 34, a rear 36 configured to confront a pole or leg 18 of the tower 10, and a thickness 38 extending from the front 34 to the rear 36 and perpendicular to the height 26 and the width 32. The bracket 20 may be comprised of, for example, one or more of the following: a rear plate 40, an upper horizontal plate 44 extending forwardly from the rear plate 40 generally perpendicular to the bracket height 26, a lower horizontal plate 42 located below the upper horizontal plate 44 and extending forwardly from the rear plate 40, and a vertically-oriented eye bolt 46 that may include a looped head 48 located below the lower horizontal plate 42 and a threaded shaft 50 extending from the looped head 48 upwardly through the lower horizontal plate 42 and the upper horizontal plate 44. Optionally, the lower and upper horizontal plates 44 and 42 are oriented parallel to each other. Two different designs of brackets 20 are shown in the Figures. One design, shown in FIGS. 17-22, generally includes a top bracket 20 and a lower bracket 20 with two separate rear plates 42 that are connected to each other via braces 160. The other design, shown in FIGS. 1-14, uses a single bracket 20 with one long rear plate 20.

Optionally, the method further comprises: b) providing a cable system 52 or a leg strap/leg clamp bar 58, which may have a left end 54 and a right end 56.

Optionally, the method further comprises: c) securing the bracket 20 to the tower by placing the bracket rear 36 against a pole or leg 18 of the tower 10 and wrapping the cable system 52 or leg strap/leg clamp bar 58 at least partially around the pole or leg 18 of the tower 10 (e.g., so that after step c), the bracket 20 and the cable system 52 extend around the pole or leg 18.

Optionally, if the tower 10 is a monopole, as shown in FIGS. 1-10 and 17-22, step b) comprises providing a cable system 52 comprising a left end 54 and a right end 56, step c) comprises placing the bracket rear 36 against the monopole 10, attaching the left or right end of the cable system 54 or 56 to the bracket 20, wrapping the cable system 52 at least partially around the monopole 10 and then attaching the other end of the cable system 52 to the bracket 20. However, other methods are possible, such as placing the bracket rear 36 against the monopole 10 and attaching the left and right ends of the cable system 52 and 56 to the bracket 20 simultaneously.

Optionally, the cable system 52 is U-shaped. The cable system 52 may comprise one or more components such as strap(s), chain(s), etc.

Optionally, if the tower 10 is a guyed or self-support tower, if the bracket 20 is secured to a leg 18, as shown in FIGS. 11-14, the bracket 20 is secured to the leg strap/leg clamp bar 58 (and thereby a leg 18 of the tower 10 by the tension provided by the leg strap/leg clamp bar 58) by a plurality of leg strap fasteners 60. Optionally, as shown in FIGS. 11-14, the if a leg strap 58 used, it may comprise a left straight segment 62 comprising the left end 54, a right straight segment 64 comprising the right end 56, and an arc-shaped middle segment 66 between the left and right straight segments 62 and 64 and extending at least partially around the leg 18.

In some embodiments, as shown in FIGS. 17-22, the rear plate 40 comprises a rear 90 forming the bracket rear 36 and engaging the leg or pole 18 of the tower 10. Optionally, the rear plate 40 comprises at least one recess (e.g., as described below, semi-circular recess 84 as well as recessed area created by left angled edge 80 and right angled edge 82) engaging the leg or pole 18. Optionally, as shown in FIGS. 17-22, for example, the rear plate 40 comprises a left side 76 and a right side 78, the rear plate rear 90 is wedge-shaped and comprises a left angled edge 80, a right angled edge 82, and a semi-circular recess 84 located between the left angled edge 80 and the right angled edge 82, and the left angled edge 80 slopes forwardly (towards the rear plate front 90) from the left side 76 of the rear plate 40 toward the semi-circular recess 84, and the right angled edge 82 slopes forwardly (towards the rear plate front 90) from the right side 78 of the rear plate 40 toward the semi-circular recess 84, or any combination of the aforementioned features. Optionally, the tower 10 is a monopole comprising a plurality of sides 86 and the left angled edge 80 and the right angled edges 82 confront at least two sides 86 of the monopole 10, as shown in FIGS. 17-22. Optionally, the left edge 80 and the right edge slope 82 forwardly and are angled between about 150 degrees and about 170 degrees (e.g., 160 degrees) relative to each other. Alternatively, instead of a monopole 10, the tower 10 may comprise a plurality of legs 18 and, optionally, in such embodiments, one of the legs 18 is partially located in the semi-circular recess 84.

Alternatively, as shown in FIGS. 1-14, the bracket rear 36 comprises an adapter bracket 170, which is attached to the rear plate rear 90 and includes a recess 172 engaging the leg or pole 18. Adapter brackets 170 designed to attach to different tower poles or legs 18 are shown in FIGS. 15A-15E and 16A-16E. In one embodiment, as shown in FIGS. 1-10 and 15A and 16A, the adapter bracket 170 includes a first plate 176 that includes a first recess 172a that is wedge-shaped and is designed to accommodate two sides 86 of a monopole 10 and a second plate 178 that is oriented perpendicular to the first plate 176 and includes a second recess 172b that is designed to accommodate leg or pole 18 of a different type of tower 10. Both first and second plate 176 and 178 may include fastener holes 180 that receive fasteners 182 to allow the first and second plates 176 and 178 to attach to the rear plate rear 90. Optionally, as shown in FIGS. 1-10, 15A and 16, the adapter bracket 170 with first and second plates 176 and 178 is L-shaped. The design of the adapter bracket 20 shown in FIGS. 1-10 and 15A and 16A allows users to attach to different types of towers 10 by inverting the adapter bracket 20.

Optionally, as shown in FIGS. 17-22, the lower and upper horizontal plates 42 and 44 each comprise a top 92 and 96 and a bottom 94 and 98, the bracket 20 comprises one or more upper triangular shaped braces 100 extending between the rear plate front 88 and the upper horizontal plate top 92 and one or more lower triangular shaped braces 102 extending between the rear plate front 88 and the lower horizontal plate bottom 98.

Optionally, as shown in FIGS. 1-14 and 17-22, the bracket 20 further comprises a rotatable left cable adjustment bracket 104 and a rotatable right cable adjustment bracket 110. More particularly, the rotatable left cable adjustment bracket 104 may be located between the upper and lower horizontal plates 44 and 42, and may be pivotally attached to the upper and lower horizontal plates 44 and 42 by at least one left bolt/pin 106 oriented parallel to the bracket height 26. Optionally, the rotatable left cable adjustment bracket 104 is further attached to the left end 54 of the cable system 52. Optionally, the rotatable left cable adjustment bracket 104 is configured to rotate clockwise and/or counter-clockwise about a left bolt/pin axis 108 extending generally parallel to the bracket height 26 to adjust the cable system 52 around the tower pole or leg 18. The right cable adjustment bracket 110 may be located between the upper and lower horizontal plates 44 and 42, and may be pivotally attached to the upper and lower horizontal plates 44 and 42 by at least one right bolt/pin 112 oriented parallel to the bracket height 26. Optionally, the rotatable right cable adjustment bracket 110 is further attached to the right end 56 of the cable system 52, and the rotatable right cable adjustment bracket 110 is configured to rotate clockwise and/or counter-clockwise about a right bolt axis 114 extending generally parallel to the bracket height 26 to adjust the cable system 52 around the tower pole or leg 18. Optionally, the rotatable left cable adjustment bracket 104 comprises an upper bolt hole 116 oriented vertically and receiving an upper bolt 118 attaching the rotatable left cable adjustment bracket 104 to the upper horizontal plate 44, a middle bolt hole 126 oriented horizontally and receiving the left end 54 of the cable system 52, and a lower bolt hole 120 oriented vertically and receiving a lower bolt 122 attaching the rotatable left cable adjustment bracket 104 to the lower horizontal plate 42. Optionally, the rotatable right cable adjustment bracket 110 likewise comprises an upper bolt hole 116 oriented vertically and receiving an upper bolt 118 attaching the rotatable right cable adjustment bracket 110 to the upper horizontal plate 44, a middle bolt hole 126 oriented horizontally and receiving the right end 56 of the cable system 52, and a lower bolt hole 120 oriented vertically and receiving a lower bolt 122 attaching the rotatable right cable adjustment bracket 104 to the lower horizontal plate 42. In other words, the upper bolt 118 and lower bolt 122 of the respective rotatable left and right cable brackets 104 and 110 may be the aforementioned at least one left bolt/pin 106 and the at least one right bolt/pin 114.

Optionally, if the tower 10 is a monopole, step b) comprises providing a cable system 52 having a left end 54 and a right end 56, the left end 54 of the cable system 52 comprises a left horizontally-oriented eye bolt 124 removably inserted into the middle bolt hole 126 of the rotatable left cable adjustment bracket 104 and the right end 56 of the cable system 52 comprises a right horizontally-oriented eye bolt 124 removably inserted into the middle bolt hole 126 of the rotatable right cable adjustment bracket 110.

The upper bolt 118 may comprise a head 123 located below the upper horizontal plate 44 and above the lower horizontal plate 42 and a threaded shaft 125 extending through the upper bolt hole 116 of the respective rotatable bracket 104 and 110. An upper flat washer 127 may extend around the threaded shaft and may be located above the upper horizontal plate 44, a lock nut 129 may be located above the upper flat washer 127 and may extend around the threaded shaft 125, and/or a lower flat washer may extend around the threaded shaft 125 and may be located below the upper horizontal plate 44 and above the head 123.

The lower bolt 122 may comprise a head 131 located below the upper horizontal plate 44 and above the lower horizontal plate 42 and a threaded shaft 133 extending through the lower bolt hole 120 of the respective rotatable cable adjustment bracket 104 and 110. An upper flat washer 135 may extend around the threaded shaft 133 and may be located above the lower horizontal plate 42 and below the head 131, a lower flat washer may extend around the threaded shaft 133 and may be located below the lower horizontal plate 42, and/or a lock nut 137 may be located below the lower flat washer and may extend around the threaded shaft 133.

In some embodiments, the upper bolt 118 and lower bolt 122 of the rotatable right cable adjustment bracket 110 is configured to rotate with the rotatable right cable adjustment bracket 110 and the upper bolt 118 and lower bolt 122 of the rotatable left cable adjustment bracket 104 is configured to rotate with the rotatable left cable adjustment bracket 104. In other embodiments, the rotatable right cable adjustment bracket 110 is configured to rotate around the upper bolt 118 and lower bolt 122 of the rotatable right cable adjustment bracket 110 while the upper bolt 118 and lower bolt 122 of the rotatable right cable adjustment bracket 110 remains stationary, and the rotatable left cable adjustment bracket 104 is configured to rotate around the upper bolt 118 and lower bolt 122 of the rotatable left cable adjustment bracket 110 while the upper bolt 118 and lower bolt 122 of the rotatable left cable adjustment bracket 104 remains stationary. In still further embodiments, the rotatable right cable adjustment bracket 110 is configured to rotate around one of the upper bolt 118 and lower bolt 122 of the rotatable right cable adjustment bracket 110 while the other of the upper bolt 118 and lower bolt 122 of the rotatable right cable adjustment bracket 110 remains stationary, and the rotatable left cable adjustment bracket 104 is configured to rotate around one of the upper bolt 118 and lower bolt 122 of the rotatable left cable adjustment bracket 104 while the other of the upper bolt 118 and lower bolt 122 of the rotatable left cable adjustment bracket 104 remains stationary.

Optionally, as shown in the illustrations (e.g., in FIGS. 5-7, 14, and 22) the rotatable left cable adjustment bracket 104 is configured to extend laterally beyond the rear plate left side 78 and the rotatable right cable adjustment bracket 110 is configured to extend laterally beyond the rear plate right side 80.

Optionally, the rear plate 40, the lower horizontal plate 42 and the upper horizontal plate 44 are separate pieces welded together. Alternatively, the rear plate 40, the lower horizontal plate 42 and the upper horizontal plate 44 may be a single piece/integral.

Optionally, the bracket 20 is comprised of metal (e.g., steel or aluminum).

Optionally, after step c), the cable system or strap 52 is wrapped tightly around the pole or leg 18 and uses tension to hold the bracket 20 in place, as opposed to using bolts to connect the bracket 20 to the tower 10.

Figure 8:
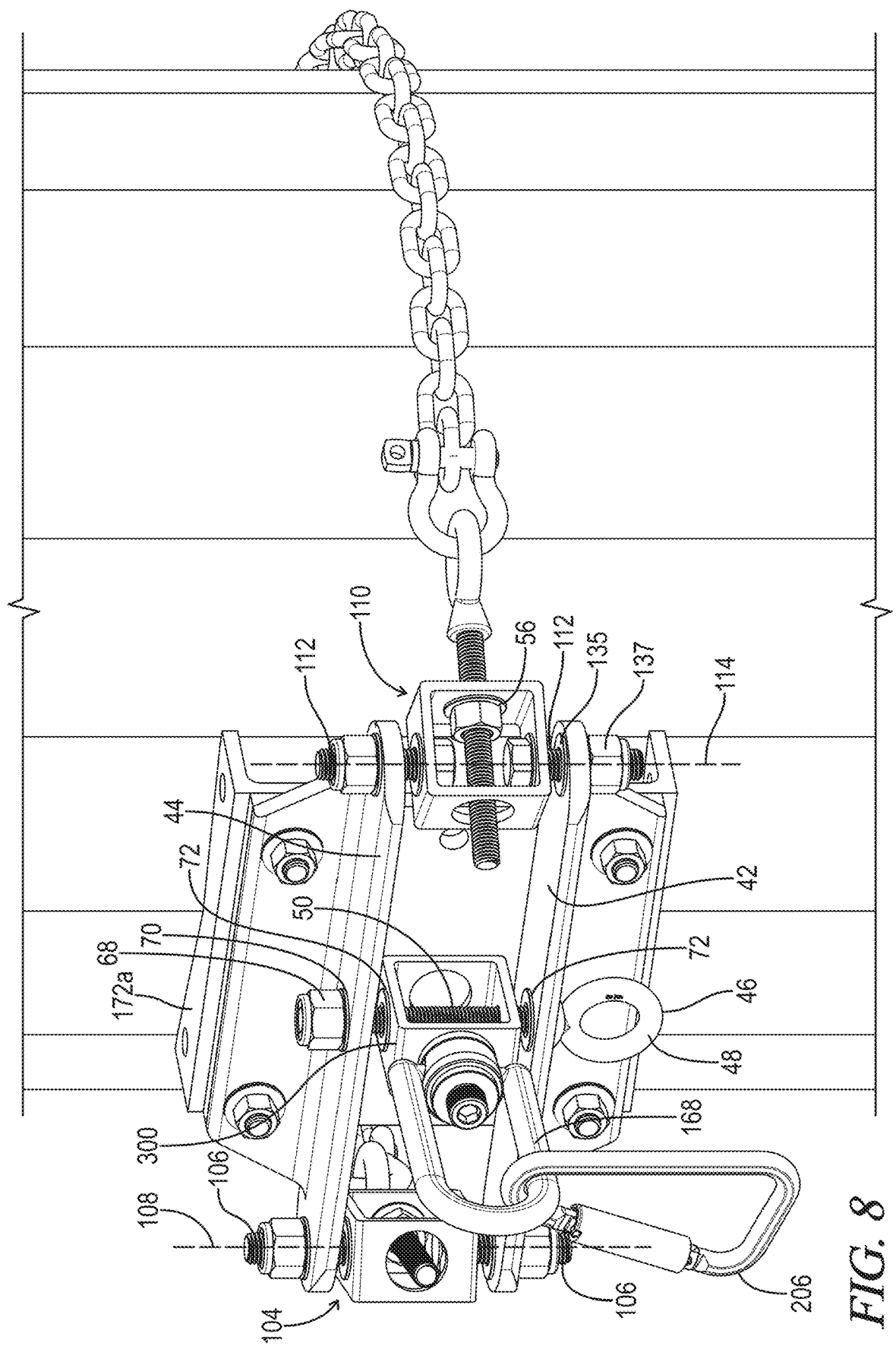
FIG. 8 illustrates a front perspective view of a bracket with a D-ring secured to a monopole by a cable system in accordance with an embodiment of the present invention.
Figure 9:
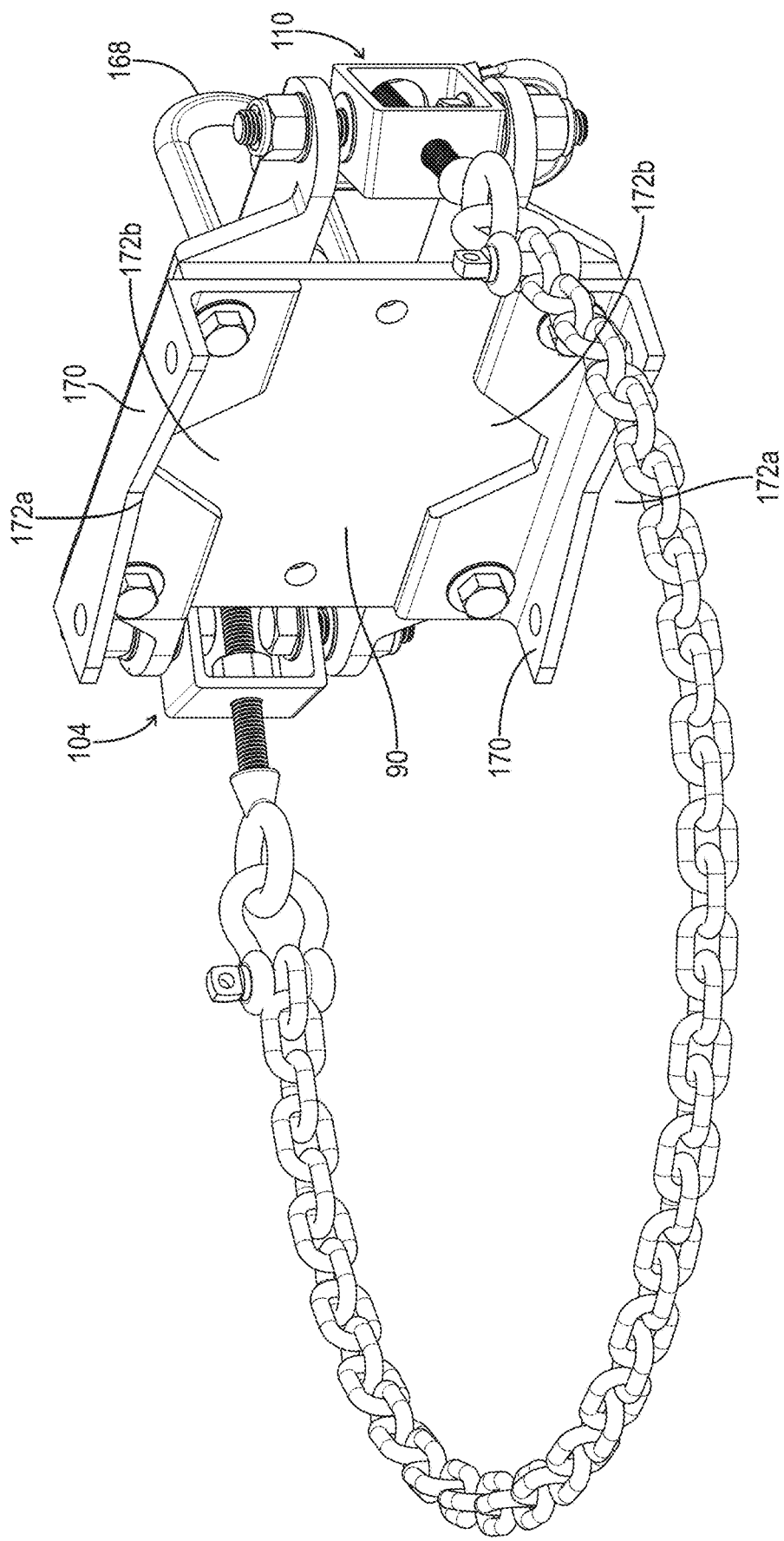
FIG. 9 illustrates a rear perspective view of the bracket and cable system of FIG. 8.
Figure 10:
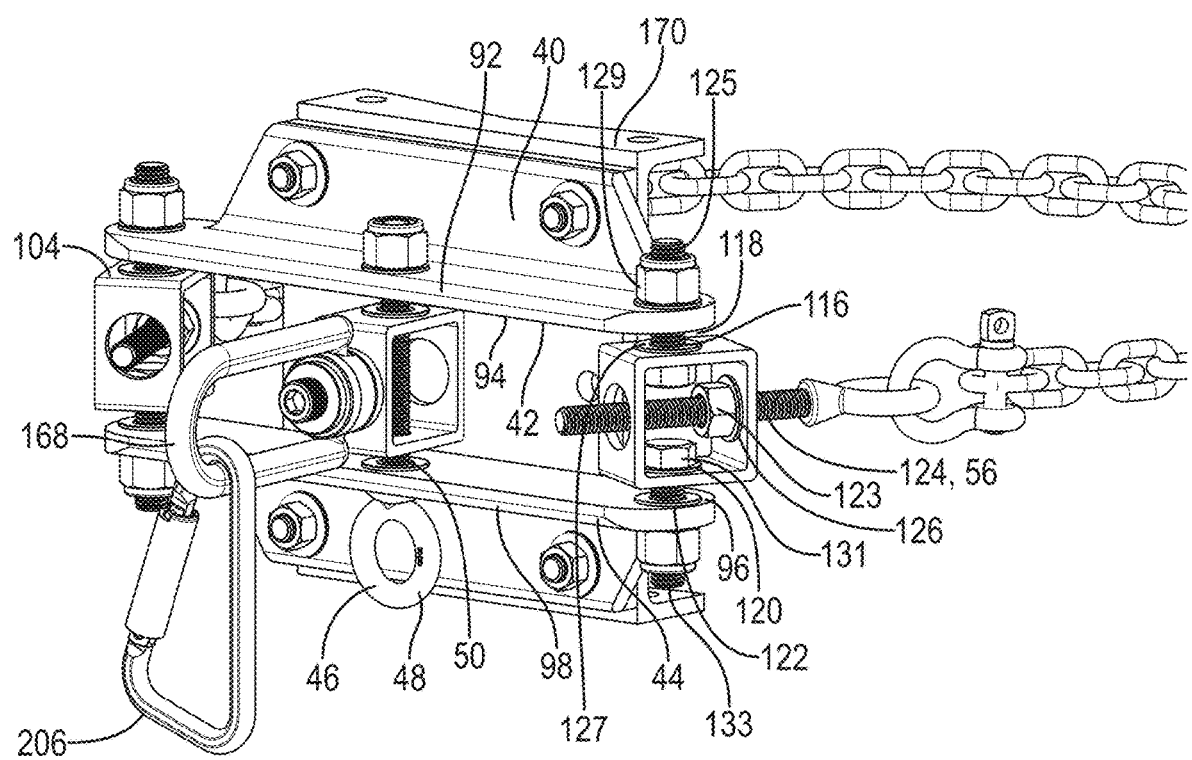
FIG. 10 illustrates a front perspective view of the bracket and cable system of FIG. 8.

In some embodiments, as shown in FIGS. 8-10, the vertically-oriented eye bolt 46 is configured to support hoisting. Optionally, the vertically-oriented eye bolt 46 is removably secured to the upper horizontal plate 44 and the lower horizontal plate 42 by a plurality of fasteners extending around the threaded shaft 50. For example, as shown in FIGS. 8-10, the plurality of fasteners may comprise an upper lock nut 68 extending around the threaded shaft 50 and located above the upper horizontal plate 44, an upper lock washer 70 extending around the threaded shaft 50 and located below the upper lock nut 68, an upper flat washer 72 extending around the threaded shaft 50 and located below the upper lock washer 70 and above the upper horizontal plate 44, a jam nut extending around the threaded shaft 50 and located below the upper horizontal plate 44 and above the lower horizontal plate 42 and a lower flat washer 72 extending around the threaded shaft 50 located below the jam nut and above the lower horizontal plate 42, or any combination thereof.

Optionally, the looped head 48 is located less than about 5 inches directly below the lower horizontal plate 42. Optionally, the looped head 48 is located less than about 2 inches directly below the lower horizontal plate 42.

In some embodiments, as shown in FIGS. 8-10, the D-ring bracket 300 is located between and attached to the upper and lower horizontal plates 44 and 42 by, for example, the vertically-oriented eye bolt 46. In such embodiment, the D-ring bracket 300 may rotate similar to the left and right rotatable cable adjustment brackets 104 and 110. A D-ring 168 may extend laterally from the D-ring bracket 300. Optionally, the D-ring 168 is able to fully support a human user located below the D-ring 168 (100% tie off), and the method further comprises the step of securing a person to the tower 10 using a user cable system comprising a lower end (not shown) and an upper end 206 by securing the lower end of the user cable system to the user and the upper end 206 of the user cable system to the D-ring 168. Optionally, the D-ring 168 is configured to fully support 3,500 pounds-force. Optionally, the upper end 206 of the user cable system comprises a lanyard attached to the D-ring 168.

In still further embodiments, as shown in FIGS. 1-7, 11-14 and 16-22, instead of the vertically-oriented eye bolt 46, the bracket 20 includes a hoist beam 132. For example, in such embodiments, the method may further comprise removing the vertically-oriented eye bolt 46 and D-ring bracket 300 and attaching a hoist beam 132 to the bracket 20, as shown in FIGS. 1-7, 11-14 and 16-22. In such embodiments, the bracket 20 with the hoist beam 132 may include one or more features described above. Optionally, the hoist beam 132 comprises a forward end 134, a rear end 136, a hoist beam length 138 extending from the forward end 134 to the rear end 136. Optionally, at least after complete installation, the hoist beam 132 extends laterally from the bracket 20.

Optionally, the method further comprises the step of securing a person to the tower 10 using a user cable system comprising a lower end and an upper end 206 by securing the lower end of the user cable system to the user and the upper end 206 of the user cable system to the hoist beam 132.

Optionally, as shown in FIGS. 1-7, 11-14 and 16-22, for example, the hoist beam 132 supports at least one load-end sheave 142 and at least one return sheave 142 located rearwardly relative to the at least one load-end sheave 142, and a load line (not shown) extends from below the at least one load-end sheave 142, at least partially around the at least one load-end sheave 142 and at least partially around the at least one return sheave 142 and then below the at least one return sheave 142.

Figure 4:
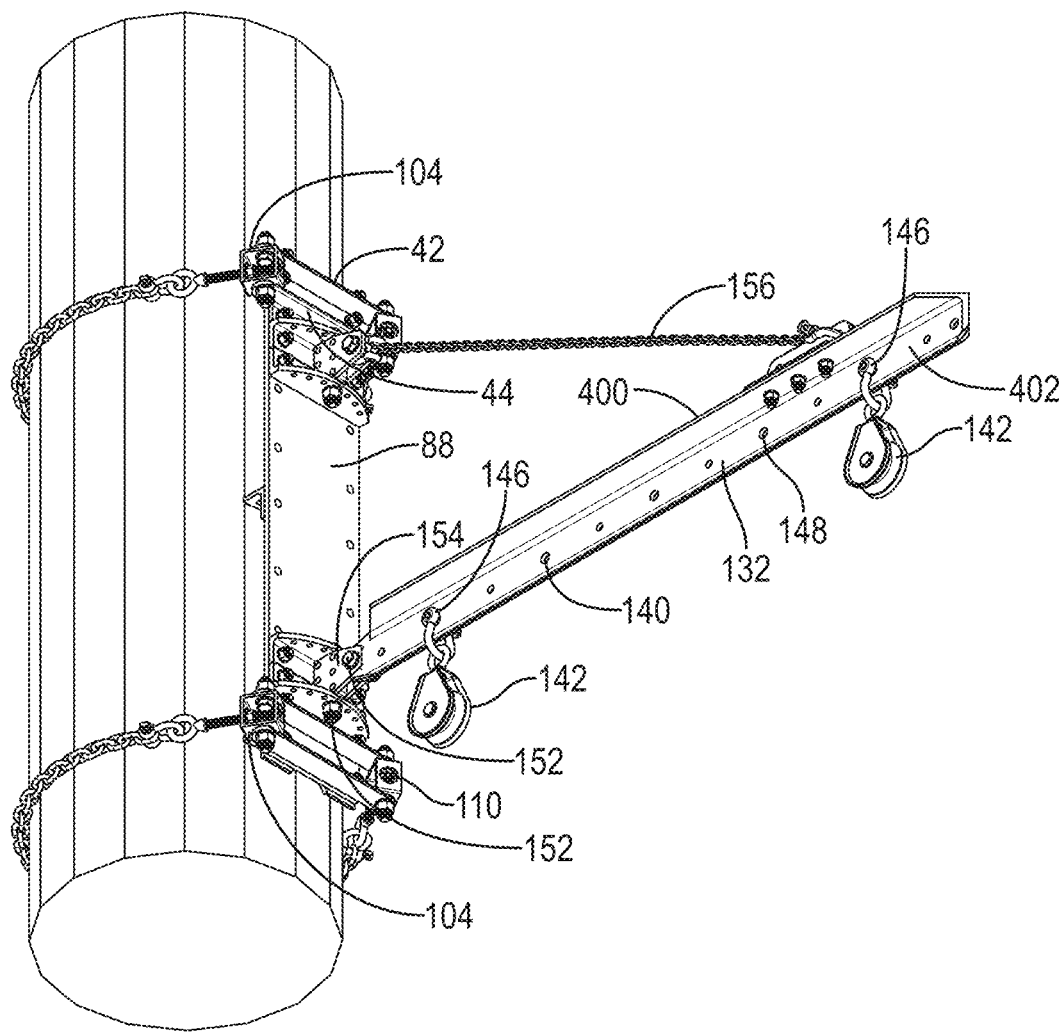
FIG. 4 illustrates a bottom perspective view of the bracket, hoist beam, cable systems and monopole of FIG. 1.
Figure 5:
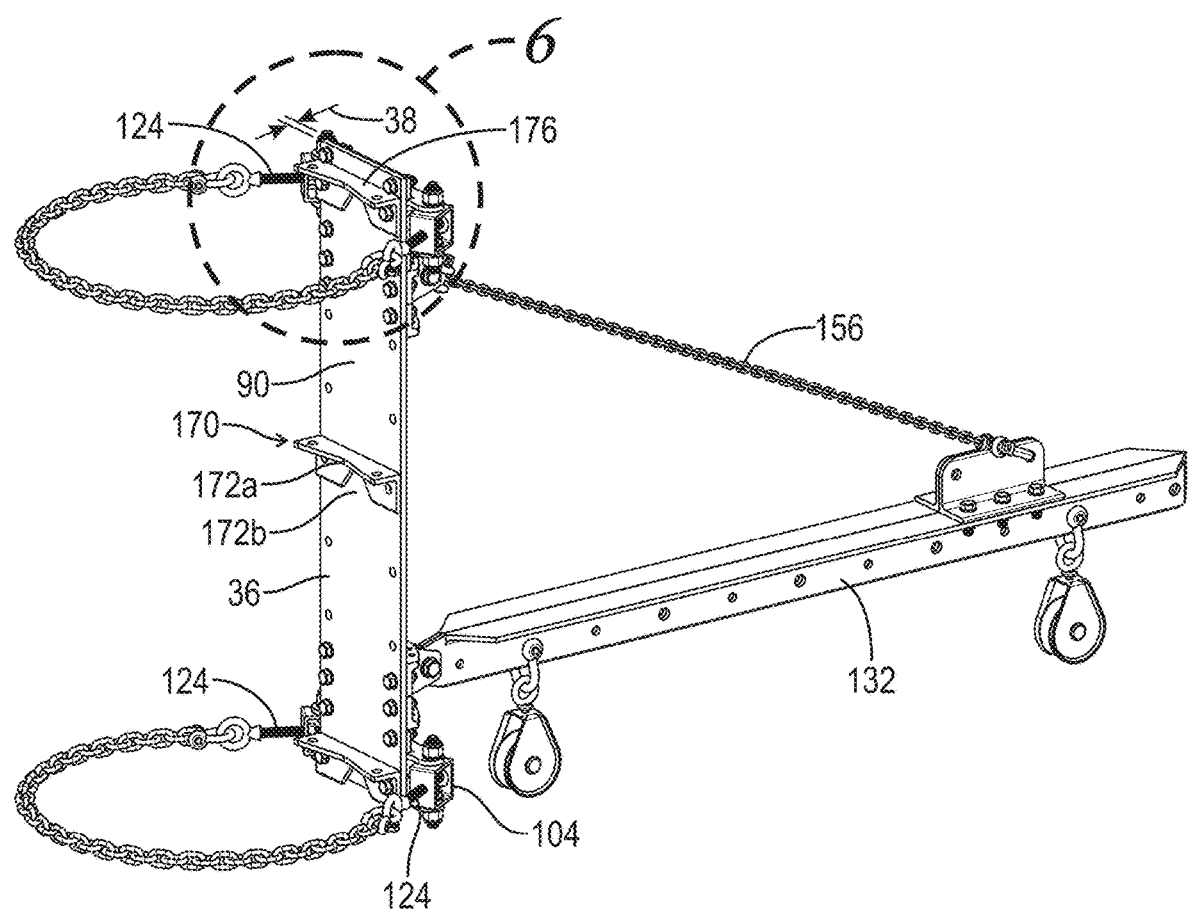
FIG. 5 illustrates a rear perspective view of the bracket, hoist beam and cable systems of FIG. 1.
Figure 6:
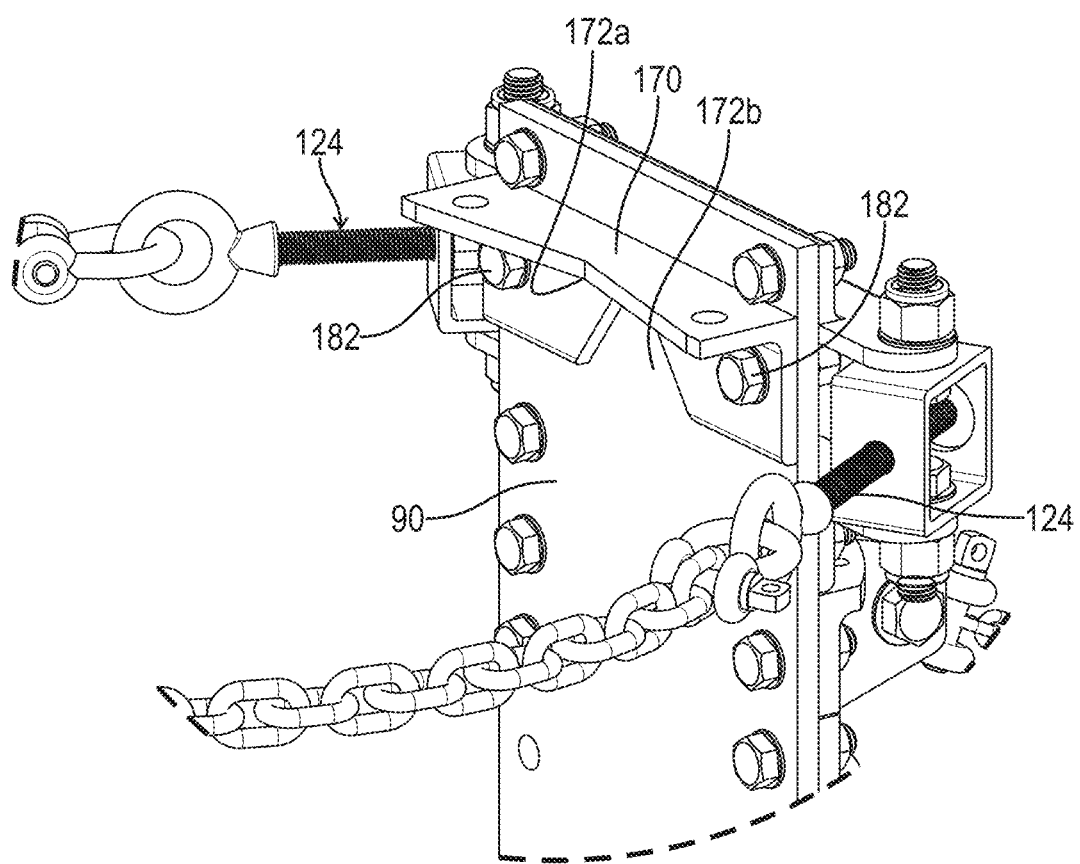
FIG. 6 illustrates a rear perspective view of the circled area labelled 6 in FIG. 5.
Figure 7:
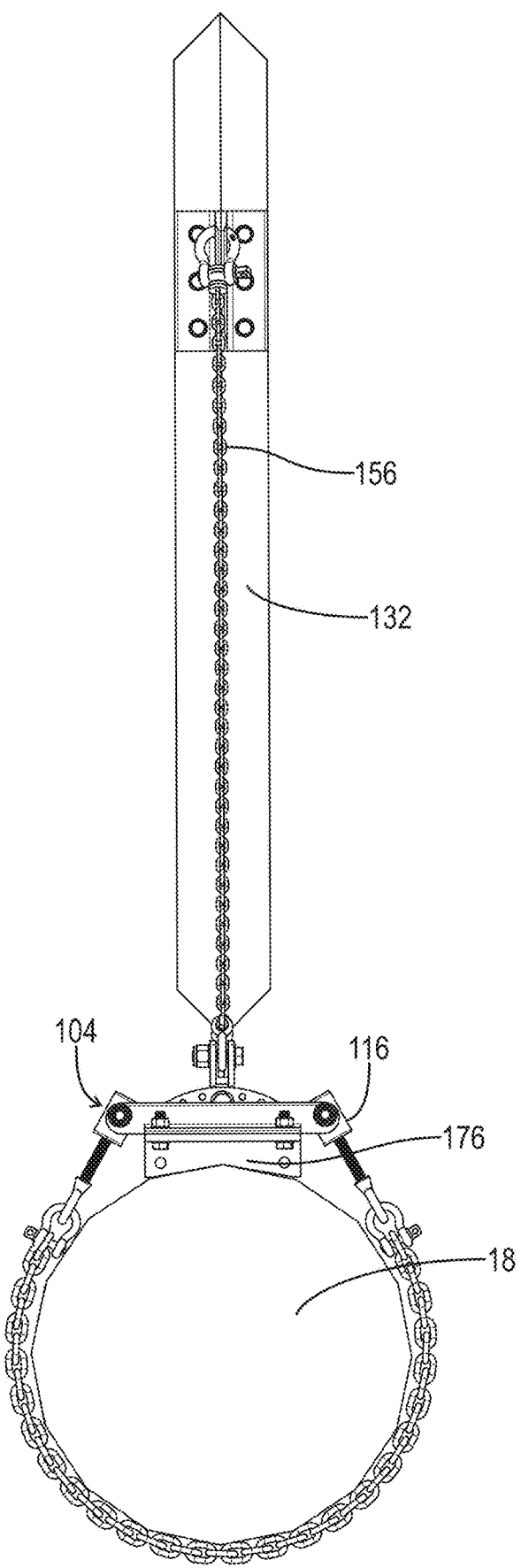
FIG. 7 illustrates a top plan view of the bracket, hoist beam, cable systems and tower of FIG. 1.

In some embodiments, the at least one load-end sheave 142 and at least one return sheave 142 are located in a channel in the hoist beam 132. In other embodiments, as shown in FIGS. 17-22 for example, the at least one load-end sheave 142 and at least one return sheave 142 are attached to moveable tabs 144 that extend below the hoist beam 132. Optionally, the hoist beam 132 comprises a plurality of fastener holes 146 extending perpendicular to the hoist beam length 138 and the moveable tabs 144 are attached to the hoist beam 132 by fasteners 148 extending through the fastener holes 146. In still further embodiments, as best seen in FIG. 4, the hoist beam 132 may be comprised of a horizontal plate 400 and a vertical plate 402 extending below the horizontal plate 400 at an angle of approximately 90 degrees and such horizontal plate 400 and a vertical plate 402 may create a L-shaped recess. In such embodiments, the sheaves 142 may be attached to the hoist beams 132 via fasteners 148 that pass through fastener holes 146 in the vertical plate 402, as shown in FIG. 4.

Optionally, the hoist beam forward 134 end is configured to tilt at least about 45 degrees towards and away from the leg or pole 18.

Optionally, the hoist beam forward end 134 is configured to rotate at least about 90 degrees clockwise and at least about 90 degrees counterclockwise around the tower leg or pole 18.

Optionally, at least after complete installation, a horizontally-oriented bolt 150 pivotably connects the hoist beam 132 to the bracket 20, the horizontally-oriented bolt 150 configured to allow the hoist beam 132 to rotate clockwise and/or counter-clockwise about a horizontally-oriented bolt pivot axis extending generally perpendicular to the tower height 16. Optionally, rotation of the hoist beam 132 about the horizontally-oriented bolt pivot axis allows the hoist beam forward end 134 to move upward and downward and toward and away from the tower top 12. In such embodiments, the horizontally-oriented bolt 150 may or may not rotate with the hoist beam 132.

Optionally, at least after complete installation, a lower vertically-oriented bolt 152 pivotably connects the hoist beam 132 to the bracket 20. The lower vertically-oriented bolt 152 may be located rearwardly relative to the horizontally-oriented bolt 150. Optionally, the lower vertically-oriented bolt 152 is configured to allow the hoist beam 132 to rotate clockwise and/or counter-clockwise about a lower vertically-oriented bolt pivot axis extending generally parallel to the tower height 16. Optionally, rotation of the hoist beam 132 about the lower vertically-oriented bolt pivot axis allows the hoist beam 132 to rotate at least partially around the pole or leg 18 in the plane perpendicular to the tower height 16. In such embodiments, the lower vertically-oriented bolt 152 may or may not rotate with the hoist beam 132.

Optionally, as shown in FIGS. 17-22, a movable bridge/yoke 154 may be located between and attached to the upper and lower horizontal plates 44 and 42, and the movable bridge/yoke may comprise a forward section comprising the horizontally-oriented bolt 150 and a rear section comprising the lower vertically-oriented bolt 152. The movable bridge/yoke 154 may be configured to rotate around the lower vertically-oriented bolt pivot axis with the hoist beam 132 to allow the hoist beam 132 to move in the plane perpendicular to the tower height 16. In other embodiments, as shown in FIGS. 1-14, the movable bridge/yoke 154 may be located between a different set of upper and lower horizontal plates 200 and 202 that is above or below to the horizontal plates 42 and 44 bracketing the rotatable left and right cable adjustment brackets 104 and 110.

Optionally, as shown in the illustrates, a brace cable 156 connects the hoist beam 132 to the pole or leg 18 and extends at an angle relative to the tower height 16 and comprises an upper end connected to the pole or leg 18 and a lower end connected to the hoist beam 132.

Optionally, the upper end of the brace cable 156 is pivotally connected to the bracket 20 via at least one pivot such that the hoist beam 132 can at least partially rotate around the pole or leg 18 in the plane perpendicular to the tower height 16.

| Parts List | |
|---|---|
| Tower | 10 |
| Tower top | 12 |
| Tower bottom | 14 |
| Tower height | 16 |
| Pole/Leg | 18 |
| Bracket | 20 |
| Bracket top | 22 |
| Bracket bottom | 24 |
| Bracket height | 26 |
| Bracket left side | 28 |
| Bracket right side | 30 |
| Bracket width | 32 |
| Bracket front | 34 |
| Bracket rear | 36 |
| Bracket thickness | 38 |
| Rear plate | 40 |
| Lower horizontal plate | 42 |
| Upper horizontal plate | 44 |
| Vertically oriented eye bolt | 46 |
| Vertically oriented eye bolt looped head | 48 |
| Vertically oriented eye bolt threaded shaft | 50 |
| Cable system | 52 |
| Cable system or leg strap left end | 54 |
| Cable system or leg strap right end | 56 |
| Leg strap or flat leg clamp bar | 58 |
| Fasteners | 60 |
| Left straight segment | 62 |
| Right straight segment | 64 |
| Arc-shaped segment | 66 |
| Lock nut | 68 |
| Lock washer | 70 |
| Flat washer | 72 |
| Rear plate left side | 76 |
| Rear plate right side | 78 |
| Left angled edge | 80 |
| Right angled edge | 82 |
| Semi-circular recess | 84 |
| Sides of tower | 86 |
| Rear plate front | 88 |
| Rear plate rear | 90 |
| Upper horizontal plate top | 92 |
| Upper horizontal plate bottom | 94 |
| Lower horizontal plate top | 96 |
| Lower horizontal plate bottom | 98 |
| Upper triangular shaped braces | 100 |
| Lower triangular shaped braces | 102 |
| Rotatable left cable adjustment bracket | 104 |
| Left bolt/pin | 106 |
| Left bolt/pin axis | 108 |
| Rotatable right cable adjustment bracket | 110 |
| Right bolt/pin | 112 |
| Right bolt/pin axis | 114 |
| Upper bolt hole | 116 |
| Upper bolt | 118 |
| Lower bolt hole | 120 |
| Lower bolt | 122 |
| Horizontally-oriented eye bolt | 124 |
| Middle bolt hole | 126 |
| Hoist beam | 132 |
| Hoist beam forward end | 134 |
| Hoist beam rear end | 136 |
| Hoist beam length | 138 |
| Channel | 140 |
| Sheaves | 142 |
| Moveable tabs | 144 |

-continued

| Parts List | |
|---|---|
| Hoist beam fastener holes | 146 |
| Hoist beam fasteners | 148 |
| Horizontally-oriented bolt | 150 |
| Lower vertically-oriented bolt | 152 |
| Moveable bridge/yoke | 154 |
| Brace cable | 156 |
| Second bracket | 20 |
| Braces | 160 |
| D-Ring | 168 |
| Adapter bracket | 170 |
| Adapter bracket recess | 172 |
| First plate | 176 |
| Second plate | 178 |

Those skilled in the art will understand how to make changes and modifications to the disclosed embodiments to meet their specific requirements or conditions. Changes and modifications may be made without departing from the scope and spirit of the invention. It is understood that use of the singular embraces the plural and vice versa. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies. In addition, the steps of the methods described herein can be performed in any suitable order, including simultaneously.

What is claimed is:

1. A method of securing a bracket to a tower comprising a tower top located above the ground, a tower bottom and a tower height extending from the tower top to the tower bottom, the tower comprised of one or more poles or legs, the method comprising performing the following steps in any suitable order including simultaneously:
    a) providing a bracket having a top, a bottom, a height extending from the top to the bottom, a left side, a right side, a width extending from the left side to the right side and perpendicular to the height, a front, a rear configured to confront a pole or leg of the tower, and a thickness extending from the front to the rear and perpendicular to the height and the width, the bracket comprised of a rear plate, an upper horizontal plate extending forwardly from the rear plate generally perpendicular to the bracket height, a lower horizontal plate located below the upper horizontal plate and extending forwardly from the rear plate;
    b) providing a cable system comprising a left end and a right end; and
    c) securing the bracket to the tower by placing the bracket rear against a pole or leg of the tower and wrapping the cable system at least partially around the pole or leg of the tower,
wherein the bracket further comprises a rotatable left cable adjustment bracket located between the upper and lower horizontal plates, pivotally attached to the upper and lower horizontal plates by at least one left bolt oriented parallel to the bracket height, wherein the rotatable cable adjustment left bracket is further attached to the left end of the cable system, wherein the rotatable left cable adjustment bracket is configured to rotate clockwise and/or counter-clockwise relative to the upper and lower horizontal plates about a left bolt axis extending generally parallel to the bracket height to adjust the cable system around the tower leg or pole, wherein the bracket further comprises a rotatable right cable adjustment bracket located between the upper and lower horizontal plates, pivotally attached to the upper and lower horizontal plates by at least one right bolt oriented parallel to the bracket height, wherein the rotatable right cable adjustment bracket is further attached to the right end of the cable system, wherein the rotatable left cable adjustment bracket is configured to rotate clockwise and/or counter-clockwise relative to the upper and lower horizontal plates about a right bolt axis extending generally parallel to the bracket height to adjust the cable system around the tower leg or pole,
    wherein the bracket further comprises a vertically-oriented eye bolt comprising a looped head located below the lower horizontal plate and a threaded shaft extending from the looped head upwardly through the lower horizontal plate and the upper horizontal plate.

2. The method of claim 1 wherein the tower is a monopole.

3. The method of claim 2 wherein the cable system comprises one or more chains.

4. The method of claim 1 wherein the cable system left end comprises a left horizontally-oriented eye bolt, the left horizontally-oriented eye bolt attached to the rotatable left cable adjustment bracket, wherein the cable system right end comprises a right horizontally-oriented eye bolt, the right horizontally-oriented eye bolt attached to the rotatable right cable adjustment bracket.

5. The method of claim 1 wherein the bracket rear comprises at least one recess engaging the leg or pole of the tower.

6. The method of claim 5 wherein the rear plate comprises a rear forming the bracket rear and comprising the at least one recess.

7. The method of claim 5 wherein an adapter bracket is removably attached to the rear plate by one or more fasteners and comprises the at least one recess.

8. The method of claim 7 wherein the adapter bracket comprises a first plate comprising a first recess configured to mate with a leg or side of a first type of tower, a second plate comprising a second recess configured to mate with a leg or side of a second type of tower, the first type of tower different than the second type of tower, the first and second plates forming a corner having an angle of approximately 90 degrees, the first and second recesses having a different shape.

9. The method of claim 8 wherein the first recess is wedge-shaped.

10. The method of claim 8 wherein the first recess comprises a left side angled edge, and a right side angled edge, and further wherein the left side angled edge slopes forwardly from the left side toward the right side angled edge and the right side angled edge slopes forwardly from the right side toward the left side angled edge.

11. The method of claim 10 wherein the left side angled edge and the right side angled edges confront at least two sides of a monopole.

12. The method of claim 10 wherein the second recess is triangular in shape or in the shape of a truncated triangle.

13. The method of claim 1 wherein the vertically-oriented eye bolt secures a D-ring bracket to the upper and lower horizontal plates, the D-ring bracket comprising a D-ring extending laterally relative to the tower.

14. The method of claim 13 wherein the D-ring bracket and D-ring are configured to rotate clockwise and/or counter-clockwise relative to the upper and lower horizontal plates about a pivot axis extending generally parallel to the bracket height.

15. The method of claim 13 further comprising securing a user to the tower by securing a lower end of a user cable support system to the user and the upper end of the user cable support system to the D-ring.

16. The method of claim 1 wherein the looped head is located less than about 2 inches directly below the lower horizontal plate.

17. The method of claim 1 wherein a hoist beam is connected to the bracket, the hoist beam comprising a forward end, and a rear end connected to the bracket, the hoist beam supporting at least one load-end sheave and at least one return-end sheave.

18. The method of claim 17 wherein the hoist beam comprises a plurality of fastener apertures spaced about the hoist beam length and oriented perpendicular to the hoist beam length and further wherein the at least one load-end sheave and at least one return-end sheave are secured to the hoist beam by a fastener extending through a fastener aperture.

19. The method of claim 1 wherein the upper and lower horizontal plates are oriented parallel to each other and separated by a gap having a height parallel to the bracket height.

20. A method of securing a bracket to a tower comprising a tower top located above the ground, a tower bottom and a tower height extending from the tower top to the tower bottom, the tower comprised of one or more poles or legs, the method comprising performing the following steps in any suitable order including simultaneously:
 a) providing a bracket having a top, a bottom, a height extending from the top to the bottom, a left side, a right side, a width extending from the left side to the right side and perpendicular to the height, a front, a rear configured to confront a pole or leg of the tower, and a thickness extending from the front to the rear and perpendicular to the height and the width, the bracket comprised of a rear plate, an upper horizontal plate extending forwardly from the rear plate generally perpendicular to the bracket height, a lower horizontal plate located below the upper horizontal plate and extending forwardly from the rear plate;
 b) providing a cable system comprising a left end and a right end; and
 c) securing the bracket to the tower by placing the bracket rear against a pole or leg of the tower and wrapping the cable system at least partially around the pole or leg of the tower,
wherein the bracket further comprises a rotatable left cable adjustment bracket located between the upper and lower horizontal plates, pivotally attached to the upper and lower horizontal plates by at least one left bolt oriented parallel to the bracket height, wherein the rotatable cable adjustment left bracket is further attached to the left end of the cable system, wherein the rotatable left cable adjustment bracket is configured to rotate clockwise and/or counter-clockwise relative to the upper and lower horizontal plates about a left bolt axis extending generally parallel to the bracket height to adjust the cable system around the tower leg or pole, wherein the bracket further comprises a rotatable right cable adjustment bracket located between the upper and lower horizontal plates, pivotally attached to the upper and lower horizontal plates by at least one right bolt oriented parallel to the bracket height, wherein the rotatable right cable adjustment bracket is further attached to the right end of the cable system, wherein the rotatable left cable adjustment bracket is configured to rotate clockwise and/or counter-clockwise relative to the upper and lower horizontal plates about a right bolt axis extending generally parallel to the bracket height to adjust the cable system around the tower leg or pole,
wherein, the bracket rear comprises at least one recess engaging the leg or pole of the tower,
wherein an adapter bracket is removably attached to the rear plate by one or more fasteners and comprises the at least one recess, and
wherein the adapter bracket comprises a first plate comprising a first recess configured to mate with a leg or side of a first type of tower, a second plate comprising a second recess configured to mate with a leg or side of a second type of tower, the first type of tower different than the second type of tower, the first and second plates forming a corner having an angle of approximately 90 degrees, the first and second recesses having a different shape.

* * * * *